(12) United States Patent
Ooi et al.

(10) Patent No.: US 6,411,416 B1
(45) Date of Patent: *Jun. 25, 2002

(54) METHOD AND APPARATUS FOR MINIMIZING THE INTENSITY OF A SPECIFIC FREQUENCY COMPONENT OF AN OPTICAL SIGNAL TRAVELLING THROUGH AN OPTICAL FIBER TRANSMISSION LINE TO THEREBY MINIMIZE THE TOTAL DISPERSION

(75) Inventors: Hiroki Ooi; George Ishikawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/044,130

(22) Filed: Mar. 19, 1998

(30) Foreign Application Priority Data

Aug. 20, 1997 (JP) .............................. 9-224056

(51) Int. Cl.⁷ ......................... H04B 10/18; H04B 10/12
(52) U.S. Cl. ........................ 359/161; 359/124; 359/173
(58) Field of Search ................................ 359/124, 127, 359/130, 161, 173

(56) References Cited

U.S. PATENT DOCUMENTS

| | | | | |
|---|---|---|---|---|
| 5,473,457 A | * | 12/1995 | Ono ............................ | 359/161 |
| 5,715,265 A | * | 2/1998 | Epworth ...................... | 372/20 |
| 5,717,265 A | * | 2/1998 | Tukamoto et al. ............ | 310/83 |
| 5,717,510 A | * | 2/1998 | Ishikawa et al. ............. | 359/161 |
| 5,982,530 A | * | 11/1999 | Akiyama et al. ............ | 359/279 |
| 5,982,963 A | * | 11/1999 | Feng et al. ................... | 385/37 |
| 6,081,360 A | * | 6/2000 | Ishikawa et al. ............. | 359/161 |

FOREIGN PATENT DOCUMENTS

EP 0 700 178 A2 3/1996 .......... H04B/10/18

OTHER PUBLICATIONS

Sano, A., et al., "Automatic dispersion equalization by monitoring extracted–clock power level in a 40–Gbit/s, 200–km transmission line," Proc. of the European Conf. On Optical Communication, 1996, XP002126413 pp. 2.207–2.210.

Koichi Takiguchi, Katsunari Okamoto, "Variable Group–Delay Disperson Equalizer Using Lattice–Form Programmable Optical Filter on Planar Lightwave Circuit", IEEE: Journal of Selected Topics In Quantum Electronics, vol. 2 No. 2, Jun. 1996.

Sergio Barcelos, Michael N. Zervas, Richard I. Laming, "Characteristics of chirped fiber gratings for dispersion compensation", OFC '96 Technical Digest.

M.M. Ohn, A.T. Alavie, R. Maaskant, M.G. Xu, F. Bilodeau, K.O. Hill, "Tunable fiber grating dispersion using a piezo-electric stack", OFC '97 Technical Digest.

Akihide Sano, et al., "Automatic dispersion equalization by monitoring extracted–clock power level in a 40–Gbit/s, 200–km transmission line", 22nd European Conference on Optical Communication ECOC '96, Olso.

* cited by examiner

*Primary Examiner*—Leslie Pascal
(74) *Attorney, Agent, or Firm*—Staas & Halsey LLP

(57) ABSTRACT

A method and apparatus for minimizing the intensity of a specific frequency component of an optical signal travelling through an optical fiber transmission line, to thereby minimize the total dispersion in the transmission line. More specifically, the intensity of a specific frequency component of an optical signal transmitted through the transmission line is detected. The optical signal has an intensity v. total dispersion characteristic curve with a corresponding eye opening. The total dispersion is controlled to minimize the intensity of the specific frequency component in the eye opening, thereby minimizing the total dispersion.

74 Claims, 26 Drawing Sheets

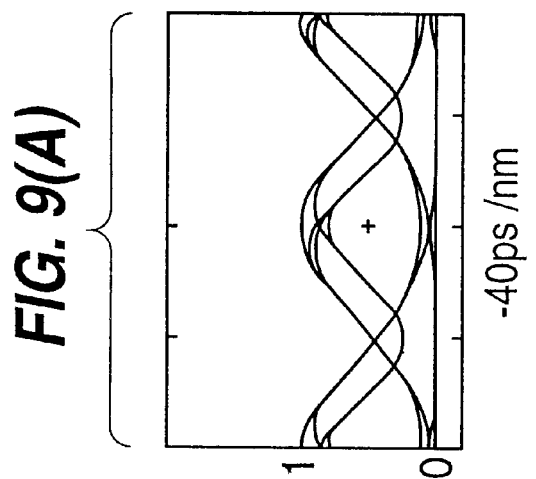
FIG. 9(A) −40ps/nm
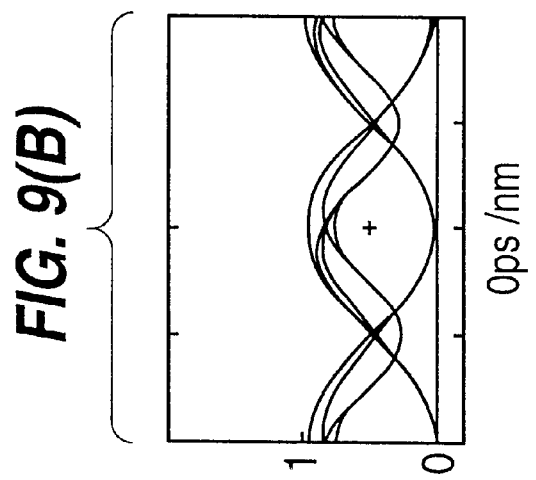
FIG. 9(B) 0ps/nm
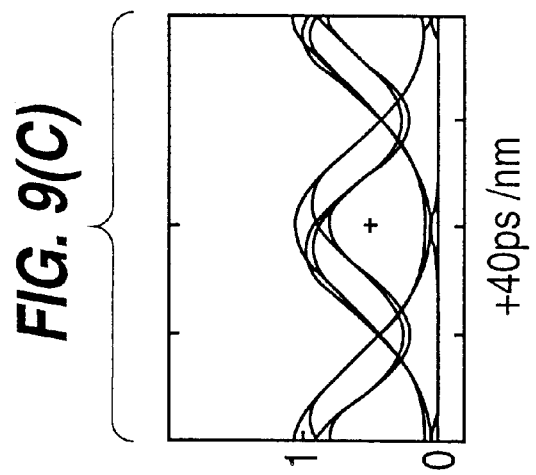
FIG. 9(C) +40ps/nm

METHOD AND APPARATUS FOR MINIMIZING THE INTENSITY OF A SPECIFIC FREQUENCY COMPONENT OF AN OPTICAL SIGNAL TRAVELLING THROUGH AN OPTICAL FIBER TRANSMISSION LINE TO THEREBY MINIMIZE THE TOTAL DISPERSION

CROSS-REFERENCE TO RELATED APPLICATIONS

This application is based on, and claims priority to, Japanese Application No. 9-224056, filed Aug. 20, 1997, in Japan, and which is incorporated herein by reference.

BACKGROUND OF THE INVENTION

1. Field of the Invention

The present invention relates to a method and apparatus for reducing the amount of dispersion in an optical fiber transmission line. More specifically, the present invention relates to a method and apparatus for reducing the amount of dispersion in the transmission line by controlling the total dispersion to substantially minimize the intensity of a specific frequency component of an optical signal travelling through the transmission line.

2. Description of the Related Art

Optical transmission systems using fiber optical transmission lines are being used to transmit relatively large amounts of information. For example, optical transmission systems at 10 Gb/s are now in practical implementation in trunk-line optical communications. However, as users require larger amounts of information to be rapidly transmitted, a further increase in the capacity of optical transmission systems is required.

Time-division multiplexing (TDM) (including optical time-division multiplexing (OTDM)) and wavelength-division multiplexing (WDM) are being considered as candidates for such high capacity optical transmission systems. For example, with regard to TDM techniques, a significant amount of worldwide research is being performed on 40-Gb/s systems.

Chromatic dispersion (group-velocity dispersion (GVD)) is one of the factors limiting the transmission distance in a 40-Gb/s system. Since dispersion tolerance is inversely proportional to the square of the bit rate, the dispersion tolerance, which is about 800 ps/nm at 10 Gb/s, is reduced by a factor of 16 to about 50 ps/nm at 40 Gb/s.

For example, in measured experiments, an optical time-division multiplexed (OTDM) signal with a signal light wavelength of 1.55 $\mu$m (where transmission loss in silica fiber is the lowest) was transmitted over a distance of 50 km through a single-mode fiber (SMF). The SMF had a zero dispersion wavelength of 1.3 $\mu$m. This type of SMF is the type of fiber most widely installed around the world. The input signal light power was +3 dBm, and the bit rate was 40 Gb/s. Dispersion compensation was performed using a dispersion-compensating fiber (DCF). The width of the dispersion compensation value range allowed in order to hold the power penalty (degradation of optical signal reception sensitivity through transmission) to within 1 dB (dispersion compensation tolerance) was 30 ps/nm. Since the dispersion compensation value required at this time is 930 ps/nm (18.6 ps/nm/km×50 km), it can be seen that dispersion compensation must be carried out with an accuracy of 930±15 ps/nm, which is very close to 100% accurate compensation.

On the other hand, dispersion in a transmission line changes with time due to changes, for example, in temperature. For example, in the case of an SMF 50-km transmission, when the temperature changes between −50 to 100° C., the amount of change of the transmission line dispersion is estimated to be as follows:

(Temperature dependence of zero dispersion wavelength of transmission line)×(Temperature change)×(Dispersion slope)×(Transmission distance)=0.03 nm/° C.×150° C.×0.07 ps/nm$^2$/km×50 km=16 ps/nm.

This value can be substantial when compared with the above described dispersion compensation tolerance. Accordingly, in large-capacity transmission at 40 Gb/s and higher, transmission line dispersion must be monitored at all times to hold the total dispersion to zero. This also applies for a dispersion-shifted fiber (DSF) which has low chromatic dispersion in the 1.55 $\mu$m band.

In the development of an automatic dispersion equalization system (a system for automatically controlling total dispersion to zero by feedback), the following points present problems:

(i) Realization of a variable dispersion compensator.

(ii) Method for detecting transmission line dispersion (or the amount of total dispersion after dispersion compensation).

(iii) Method for feedback control of a dispersion compensation amount.

Regarding point (i), above, a simple approach would be to use DCFs with different dispersion compensation amounts and change the amount of dispersion compensation in a discontinuous manner by switching between the DCFs using an optical switch. Methods have been proposed for continuously varying the dispersion compensation amount by applying a stress (for example, see M. M. Ohm et al., "Tunable grating dispersion using a piezoelectric stack," OFC '97 Technical Digest, WJ3, pp. 155–156). In addition, methods have been proposed for providing a temperature gradient to a fiber grating (for example, see Sergio Barcelos et al., "Characteristics of chirped fiber gratings for dispersion compensation," OFC '96 Technical Digest, WK12, pp. 161–162). Moreover, methods have been proposed for providing a phase change due to a temperature change to a planar lightwave circuit (PLC) (for example, see K. Takiguchi, et al., "Variable Group-Delay Dispersion Equalizer Using LatticeForm Programmable Optical Filter on Planar Lightwave Circuit," IEEE J. Selected Topics in Quantum Electronics, 2, 1996, pp. 270–276). Another possible method would be to vary the transmission line dispersion by using a variable wavelength light source, rather than using a variable dispersion compensator. In that case, the center frequency of an optical filter must be varied simultaneously in an interlocking fashion.

Regarding point (ii), above, traditionally a pulse method or a phase method has been used that involves providing a plurality of light beams of different wavelengths and measuring group-delay differences or. phase differences between the output beams. However, using these methods during system operation requires that the system operation be interrupted during the measurement of the dispersion amount or that measuring light of a different wavelength from the signal wavelength be wavelength-division multiplexed with the signal light. In the latter case, the problem is that there arises a need to estimate the amount of dispersion at the signal light from the amount of dispersion measured with the measuring light, because the transmission line dispersion varies with wavelength. In A. Sano et al., "Automatic dispersion equalization by monitoring extracted-clock power level in a 40-Gbit/s, 200-km Transmission line," ECOC '96, TuD, 3.5, 1996, pp. 207–210, there is disclosed a method in which the power of a clock component (B-Hz component when data signal bit rate is B b/s) is detected from a received optical signal, and the amount of dispersion compensation is controlled so as to maximize the power. This technique can be applied for the case of a return-to-zero (RZ) signal which contains a clock component, but cannot be applied for the case where the intensity of the clock component is not the greatest at zero dispersion, as in a non-return-to-zero (NRZ) signal or in an OTDM signal where a plurality of RZ signals are time-division multiplexed with their tails overlapping each other.

Regarding point (iii), above, a possible approach would be to sweep the amount of total dispersion over a wide range using a variable dispersion compensator or a variable wavelength light source while interrupting system operation, until detecting a point where the total dispersion amount becomes zero. Then, the amount of dispersion compensation can be set to that point. However, a method that can perform control at all times without interrupting system operation is preferable.

SUMMARY OF THE INVENTION

Accordingly, it is an object of the present invention to provide a method and apparatus for controlling dispersion in an optical fiber transmission line. The intensity of a specific frequency component of an optical signal transmitted through the transmission line is detected. The optical signal has an intensity v. total dispersion characteristic curve with a corresponding eye opening. The amount of total dispersion of the transmission line is controlled to substantially minimize the intensity of the specific frequency component in the eye opening. Since the eye opening is difficult to measure, the intensity v. total dispersion characteristic curve can be described as having at least two peaks. In this case, the amount of total dispersion of the transmission line can then be controlled to substantially minimize the intensity of the specific frequency component between the two highest peaks of the intensity v. total dispersion characteristic curve.

Objects of the present invention are also achieved by providing an apparatus and method for directly controlling the intensity of the specific frequency component to substantially minimize the intensity of the specific frequency component in the eye opening, or between the two highest peaks of the intensity v. total dispersion characteristic curve of the optical signal. In this case, the intensity is directly controlled, instead of controlling the intensity by controlling the amount of total dispersion.

Further, objects of the present invention are achieved by providing an apparatus and method for controlling the total dispersion of the transmission line to maintain the intensity of the specific frequency component along a point on the intensity v. total dispersion characteristic curve which is within the eye opening.

Moreover, objects of the present invention are achieved by providing an apparatus and method where a time-division multiplexed optical signal, modulated by an n·m-bit/second data signal obtained by time-division multiplexing n optical signals each amplitudemodulated by an m-bit/second data signal, is transmitted through an optical fiber transmission line. The time-division multiplexed optical signal has an intensity v. total dispersion characteristic curve with at least two peaks. Then, either (a) an n·m-hertz frequency component is detected from the time-division multiplexed optical signal after being transmitted through the optical fiber transmission line, and the amount of total dispersion of the optical fiber transmission line is controlled to substantially minimize the intensity of the detected n·m-hertz frequency component between the two highest peaks of the intensity v. total dispersion characteristic curve of the time-division multiplexed optical signal, or (b) an m-hertz frequency component is detected from the time-division multiplexed optical signal after being transmitted through the optical fiber transmission line, and then the amount of total dispersion of the optical fiber transmission line is controlled to maximize the intensity of the detected m-hertz frequency component.

In addition, objects of the present invention are achieved by providing an apparatus and method where a time-division multiplexed optical signal, modulated by an n·m-bit/second data signal obtained by time-division multiplexing n optical signals each amplitudemodulated by an m-bit/second data signal, is transmitted through an optical fiber transmission line. The time-division multiplexed optical signal has an intensity v. total dispersion characteristic curve with at least two peaks. Then, either (a) an n·m-hertz frequency component is detected from the time-division multiplexed optical signal after being transmitted through the optical fiber transmission line, and the intensity of the detected n·m-hertz frequency component is controlled to substantially minimize the intensity between the two highest peaks of the intensity v. total dispersion characteristic curve of the time-division multiplexed optical signal, or (b) an m-hertz frequency component is detected from the time-division multiplexed optical signal after being transmitted through the optical fiber transmission line, and the intensity of the detected m-hertz frequency component is controlled to maximize the intensity.

Objects of the present invention are also achieved by providing an apparatus and method for determining the total amount of dispersion in a transmission line. More specifically, the intensity of a specific frequency component of an optical signal transmitted through a transmission line is detected. Then, the amount of total dispersion of the transmission line is determined from the intensity of the detected specific frequency component.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 9(A), 9(B) and 9(C) are waveform diagrams of an OTDM signal after being subjected to chromatic dispersion, according to an embodiment of the present invention.

DESCRIPTION OF THE PREFERRED EMBODIMENTS

Figure 1:
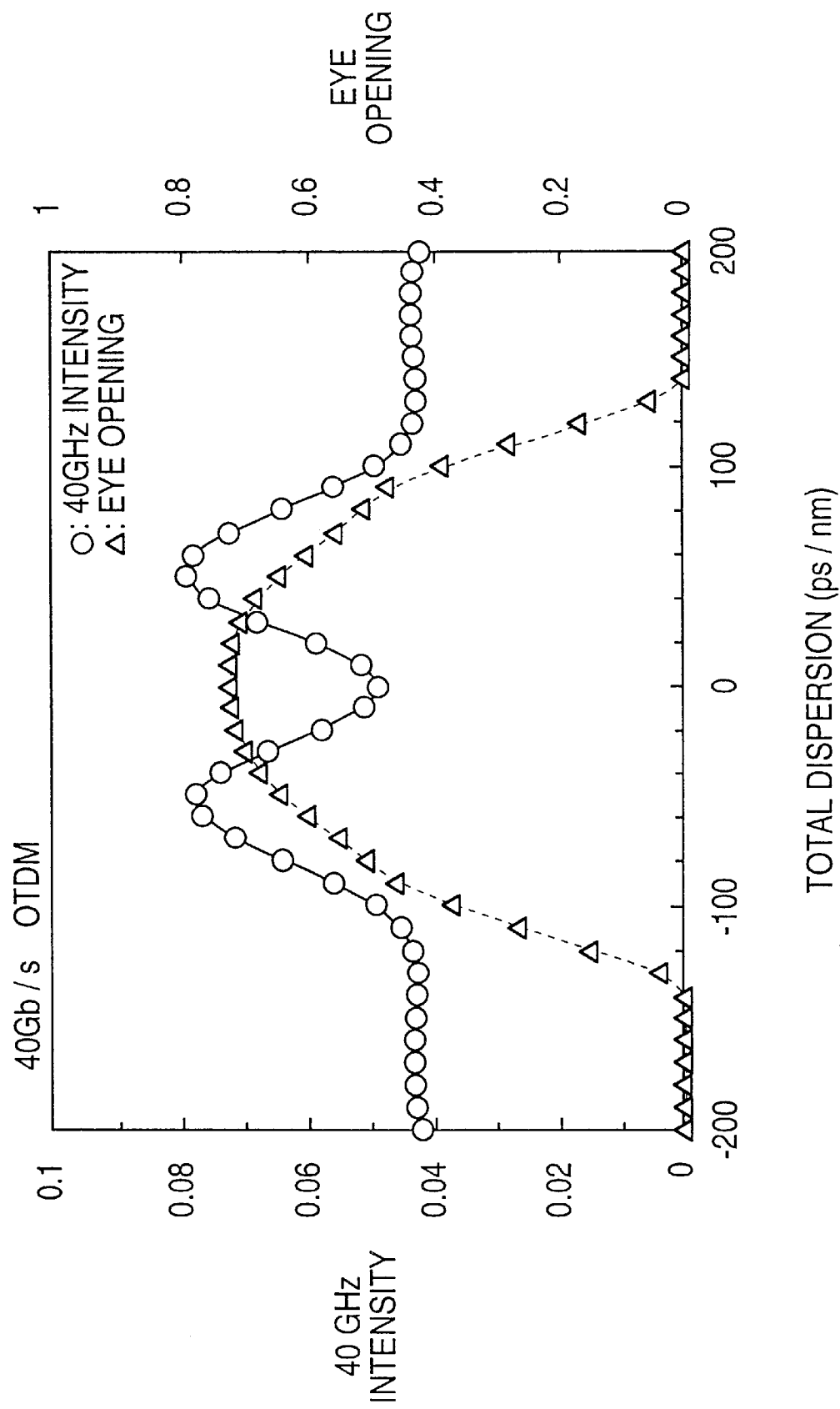
FIG. 1 is a graph illustrating computer simulation results of the dependence of a 40-GHz clock component intensity on the amount of total dispersion for a 40-Gb/s OTDM signal, according to an embodiment of the present invention.

Reference will now be made in detail to the present preferred embodiments of the present invention, examples of which are illustrated in the accompanying drawings, wherein like reference numerals refer to like elements throughout.

Figure 2:
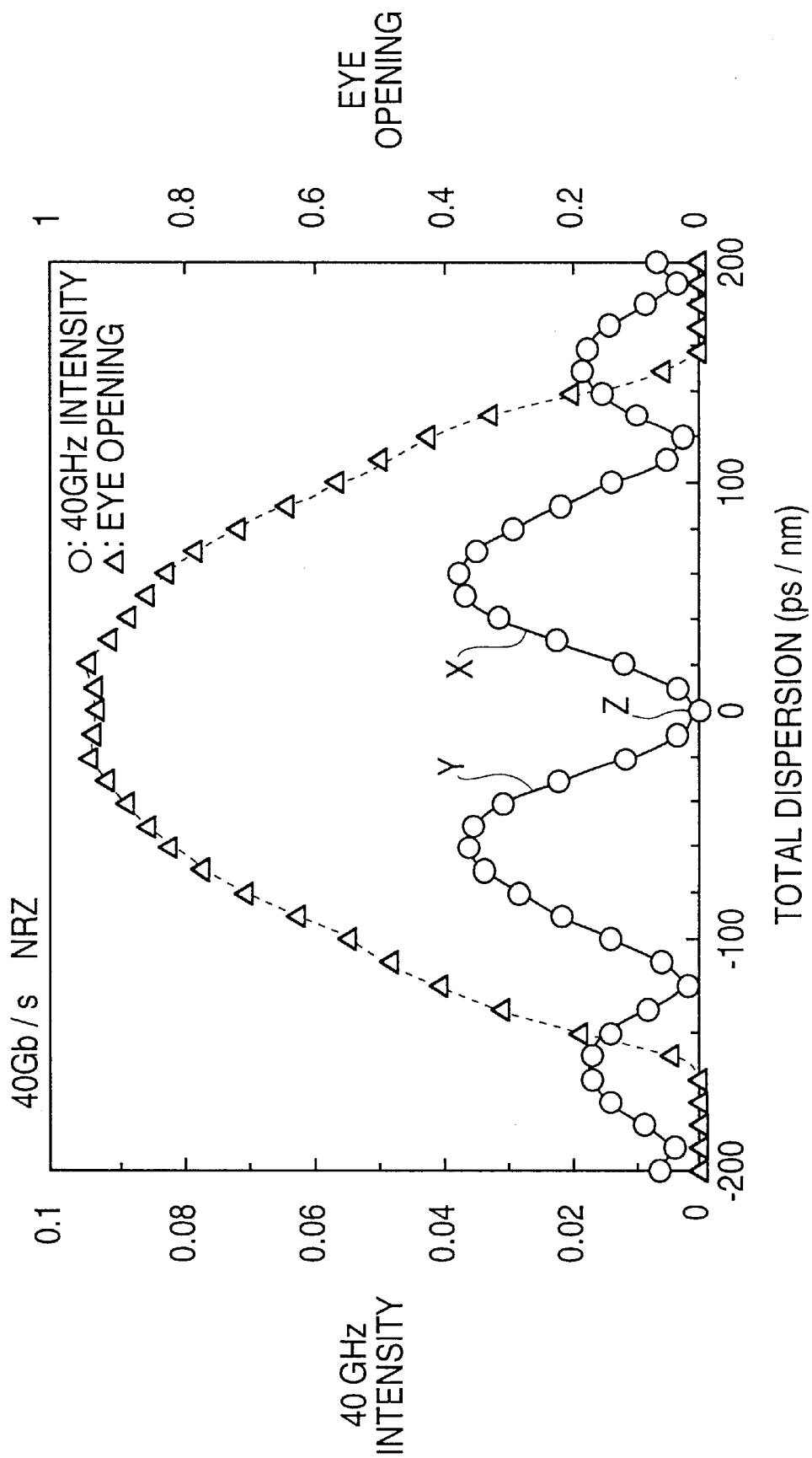
FIG. 2 is a graph illustrating computer simulation results of the dependence of a 40-GHz clock component intensity on the amount of total dispersion for a 40-Gb/s NRZ signal, according to an embodiment of the present invention.
Figure 3:
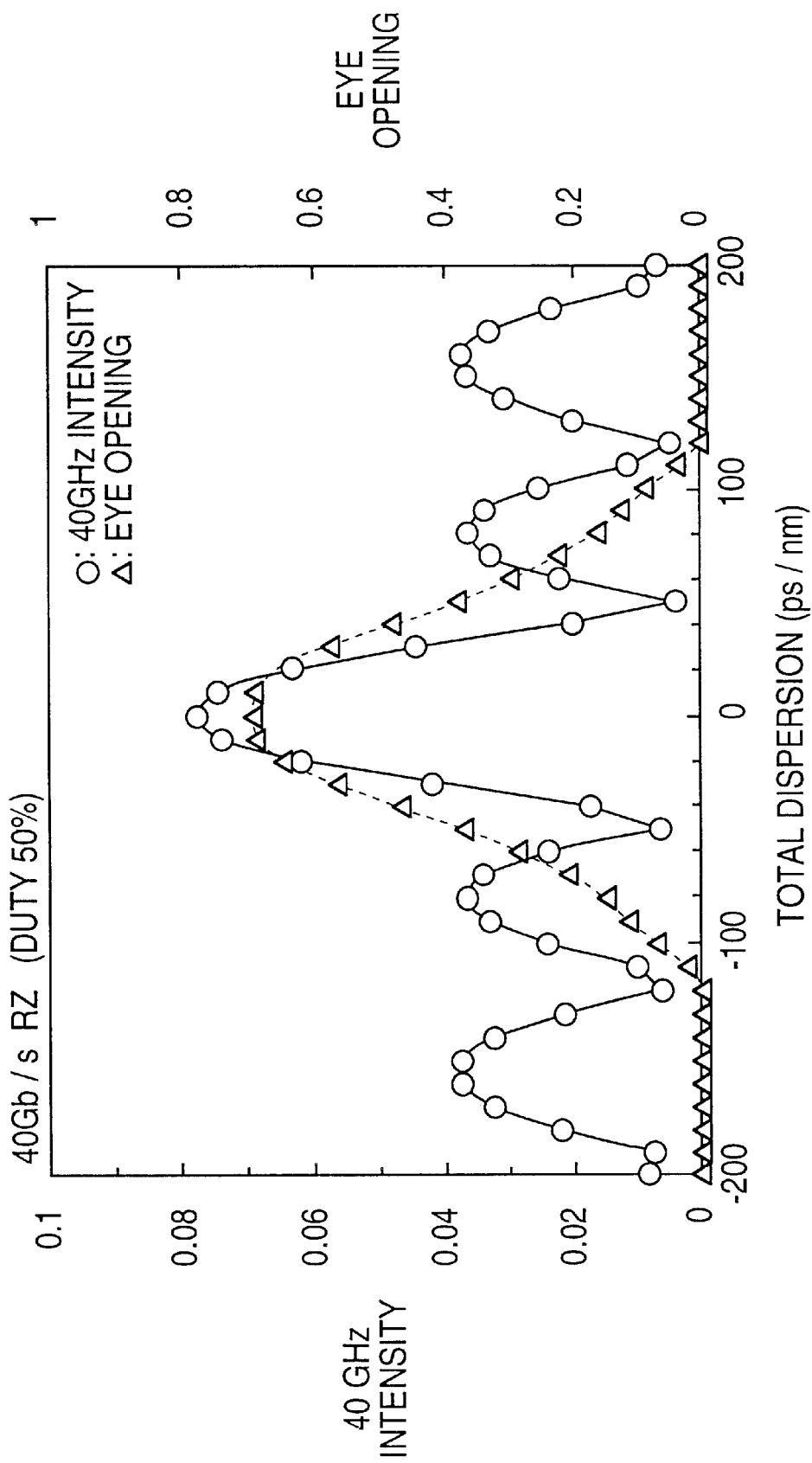
FIG. 3 is a graph illustrating computer simulation results of the dependence of a 40-GHz clock component intensity on the amount of total dispersion for a 40-Gb/s RZ signal (50% duty), according to an embodiment of the present invention.
Figure 4:
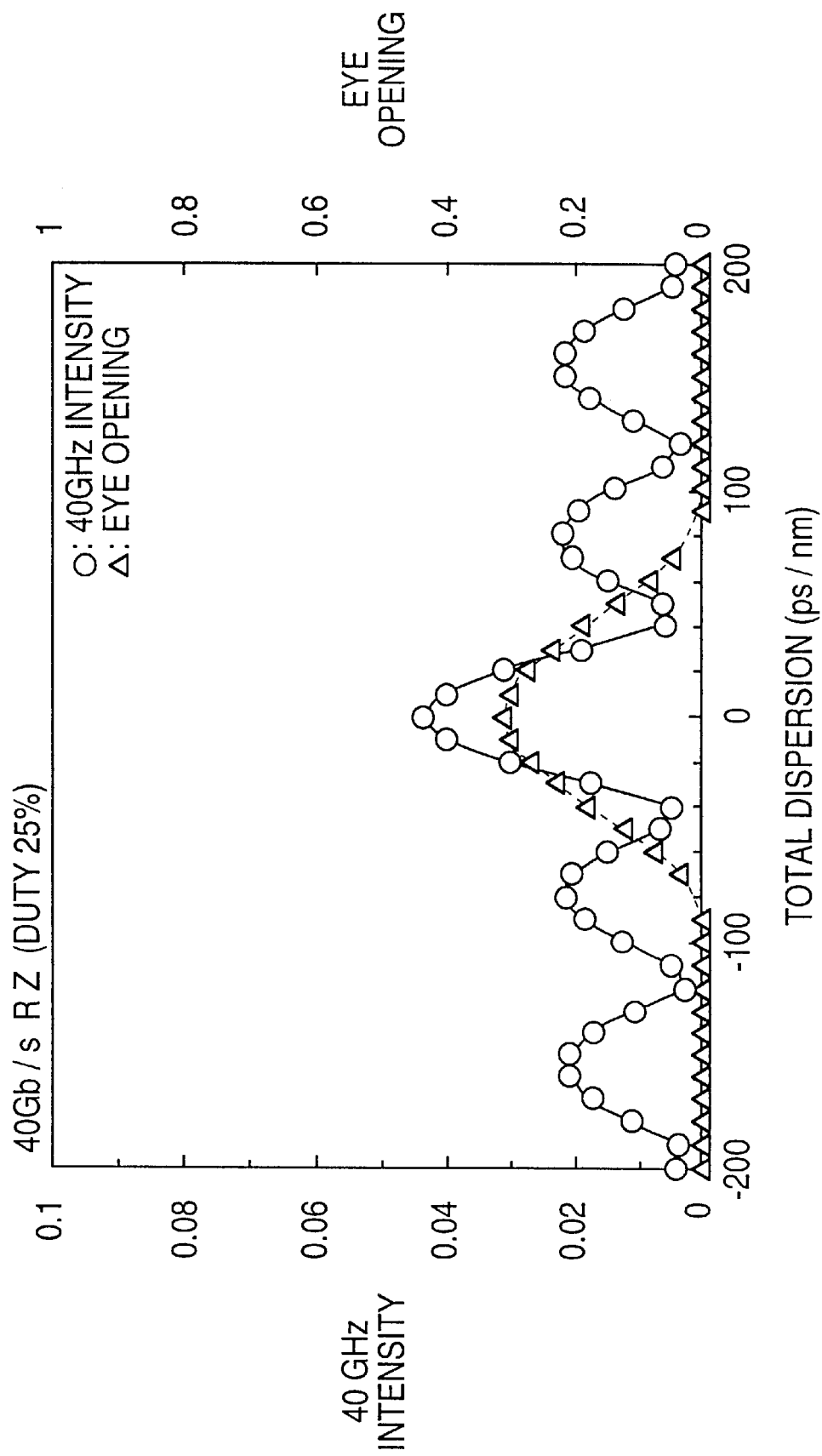
FIG. 4 is a graph illustrating computer simulation results of the dependence of a 40-GHz clock component intensity on the amount of total dispersion for a 40-Gb/s RZ signal (25% duty), according to an embodiment of the present invention.

FIG. 1 is a diagram illustrating computer simulation results of the total-dispersion dependence of the intensity of a 40-GHz component in the baseband spectrum of an OTDM signal with a data signal bit rate of 40 GHz. FIG. 2 is a diagram illustrating computer simulation results of the total-dispersion dependence of the intensity of a 40-GHz component in the baseband spectrum of an NRZ optical signal with a data signal bit rate of 40 GHz. FIG. 3 is a diagram illustrating computer simulation results of the total-dispersion dependence of the intensity of a 40-GHz component in the baseband spectrum of an RZ optical signal (50% duty) with a data signal bit rate of 40 GHz. FIG. 4 is a diagram illustrating computer simulation results of the total-dispersion dependence of the intensity of a 40-GHz component in the baseband spectrum of an RZ optical signal (25% duty) with a data signal bit rate of 40 GHz.

FIGS. 1–4 also show an eye opening in the direction of amplitude. In FIGS. 1–4, input light power was −5 dBm on average, and SMF length was 50 km. The amount of total dispersion was varied by varying the amount of dispersion in a DCF connected in series to the SMF.

Figure 5:
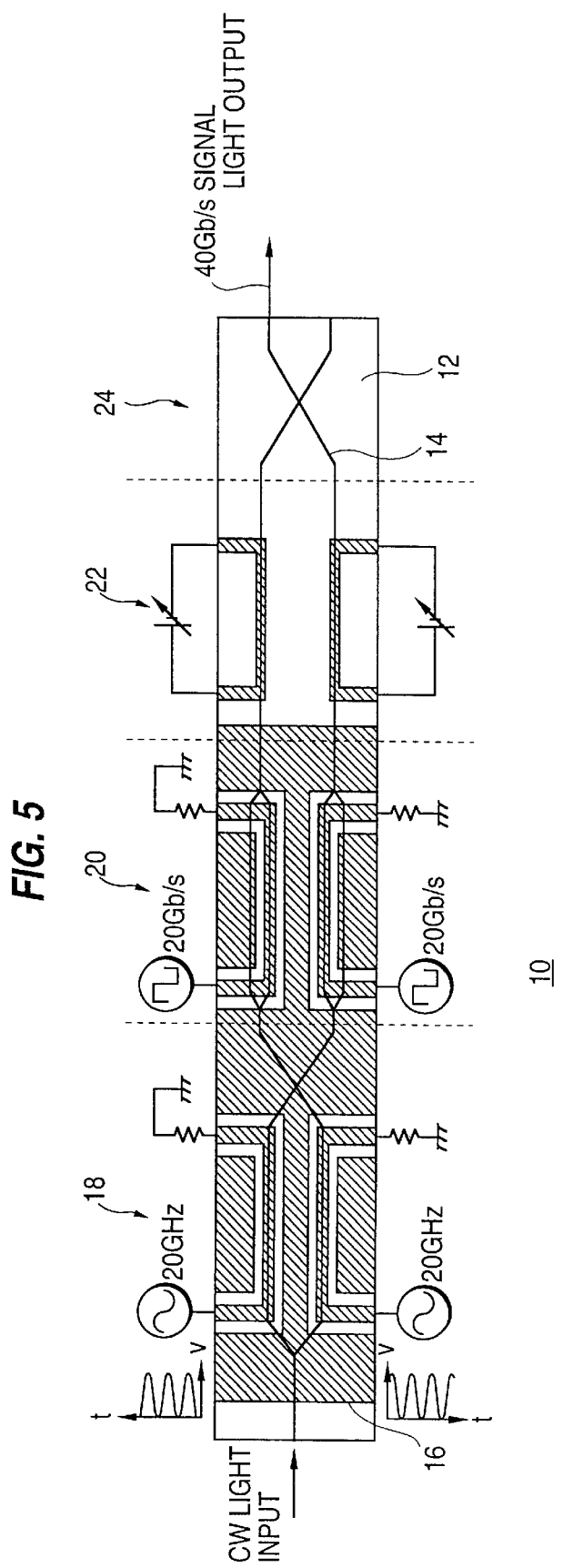
FIG. 5 is a diagram illustrating an optical modulator that generates a 40-Gb/s OTDM signal, according to an embodiment of the present invention.

FIG. 5 is a diagram illustrating an optical modulator 10 that generates the 40-Gb/s OTDM signal, according to an embodiment of the present invention. Referring now to FIG. 5, optical waveguides 14 are formed, for example, by thermally diffusing Ti into a LiNbO$_3$ substrate 12, on top of which an electrode pattern 16 (shown by hatching in FIG. 5) is formed, for example, using Au. Thus, the optical modulator 10 includes a one-input, two-output optical switch 18, a data modulator 20 having two independent optical modulators, a phase controller 22, and an optical multiplexer 24.

FIGS. 6(A), 6(B), 6(C), 6(D) and 6(E) are waveform diagrams indicating the operation of optical modulator 10, according to an embodiment of the present invention.

Figure 6:
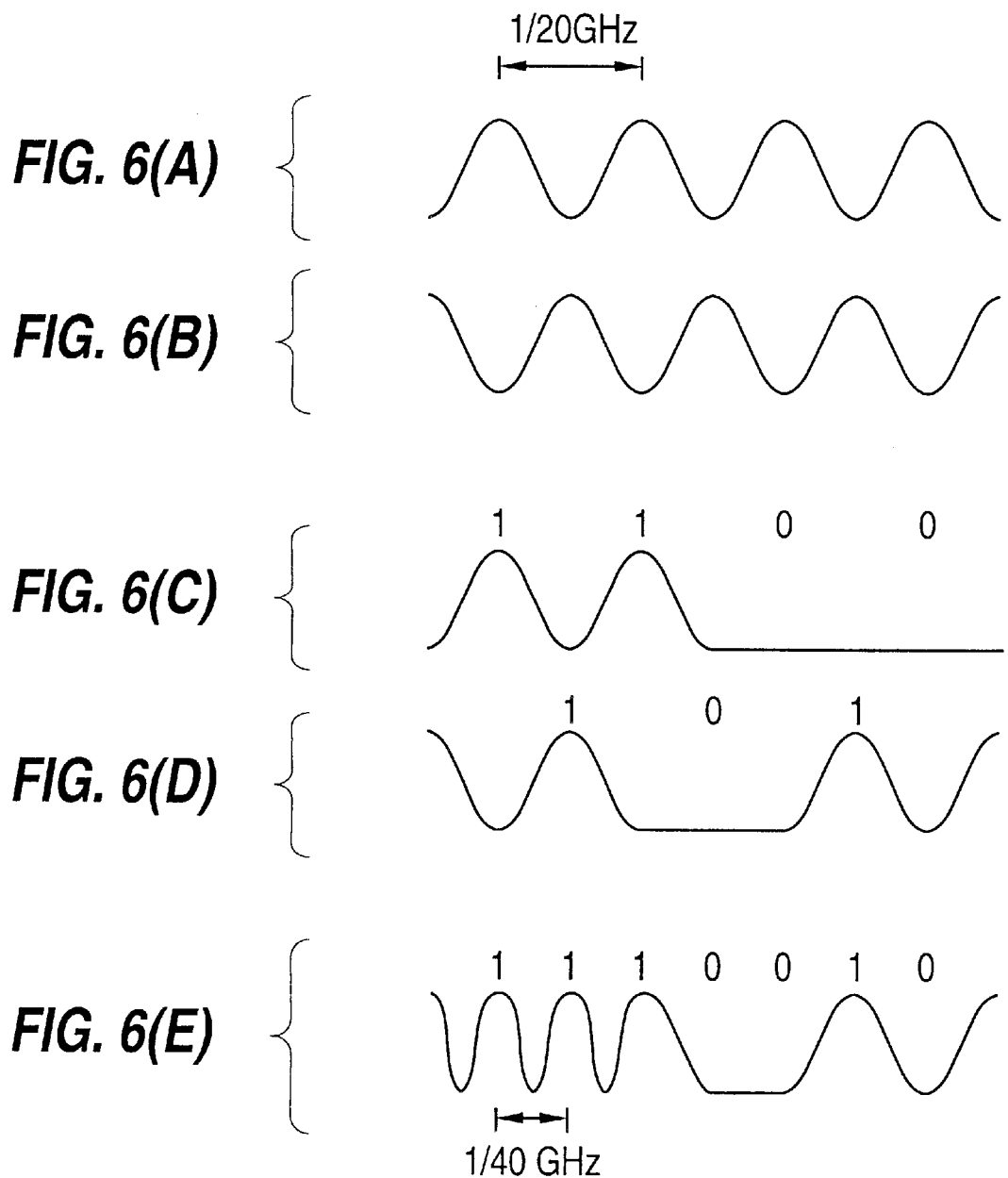
FIGS. 6(A), 6(B), 6(C), 6(D) and 6(E) are waveform diagrams indicating the operation of the optical modulator of FIG. 5, according to an;embodiment of the present invention.

Referring now to FIGS. 5, 6(A), 6(B), 6(C), 6(D) and 6(E), when continuous light is input into the optical waveguides in the one-input, two-output switch 18, and 20-GHz clocks phase-shifted by 180° are applied to the two electrodes, the 180° out-of-phase optical clock signals shown in FIGS. 6(A) and 6(B) are output from optical switch 18. These signals are then input into the two optical modulators in data modulator 20. A 20-Gb/s data signal is applied to each of the two light modulators, and the RZ signals shown in FIGS. 6(C) and 6(D) are output from data modulator 20. Phase controller 22 adjusts the phases of the light waves so that the phase difference between the two light waves is 180°, and these light waves are combined in optical multiplexer 24. Since the phase difference between the two light waves is 180°, in portions where "1"s appear successively, the tails cancel each other so that the waveform becomes close to that of an RZ signal, as shown in FIG. 6(E). In other portions where at least one of adjacent bits is a "0", the waveform becomes close to that of an NRZ signal.

In FIGS. 3 and 4, for the RZ signals represented by these figures, it is shown that the intensity of the 40-GHz component is the greatest when the amount of total dispersion is zero.

By contrast, in FIG. 1, for the OTDM signal represented by this figure, it is shown that the intensity of the 40-GHz component is at a minimum in the eye opening when the total dispersion amount is zero. Similarly, in FIG. 2, for the NRZ signal represented by the figure, it is shown that the intensity of the 40-GHz component is at a minimum in the eye opening when the total dispersion amount is zero.

Figure 7:
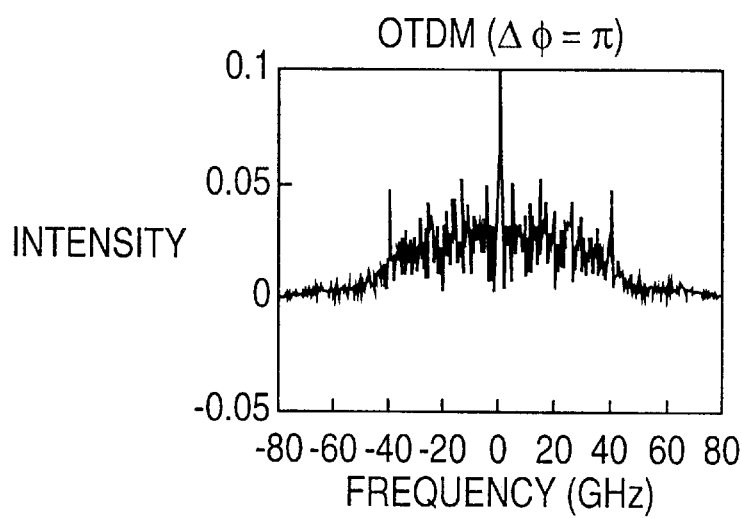
FIG. 7 is a baseband spectrum of an OTDM signal, according to an embodiment of the present invention.
Figure 8:
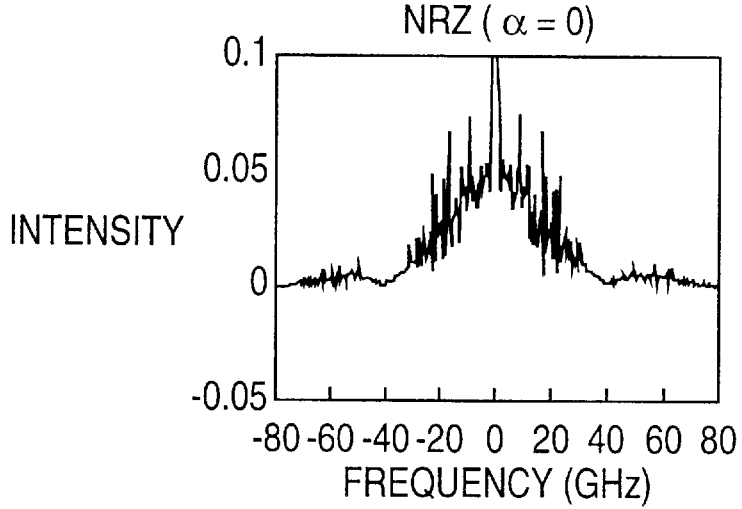
FIG. 8 is a baseband spectrum of an NRZ signal, according to an embodiment of the present invention.

For reference purposes, the baseband spectra of optical modulated signals are shown in FIGS. 7 and 8 for OTDM and NRZ, respectively. In the case of NRZ, there is no 40-GHz component, but it is presumed from a qualitative point of view that the 40-GHz component occurs because of the spectrum spreading after chromatic dispersion.

Figure 10A:
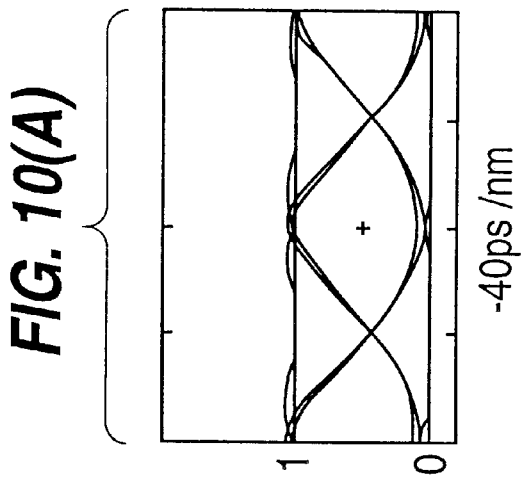
FIGS. 10(A), 10(B) and 10(C) are waveform diagrams of an NRZ signal after being subjected to chromatic dispersion, according to an embodiment of the present invention.
Figure 10B:
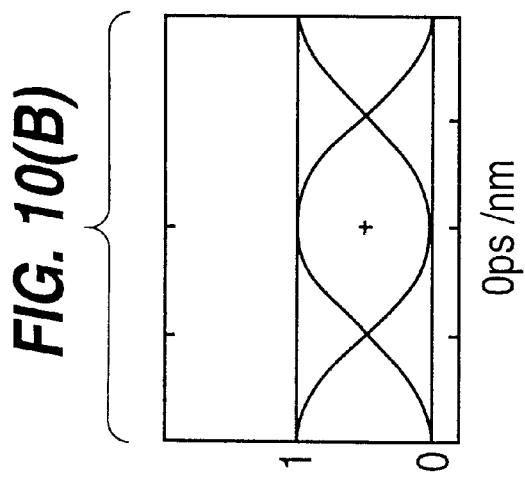
Figure 10C:
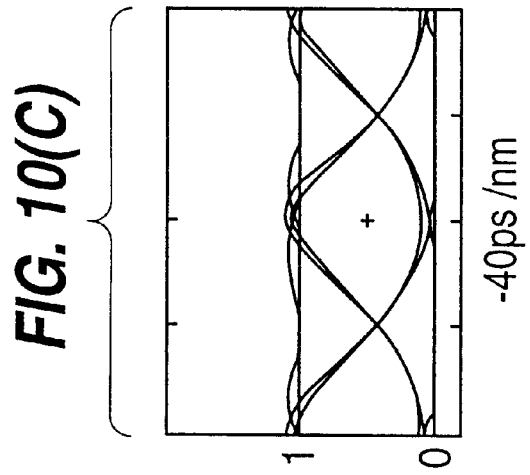

Waveforms (equalized waveforms) after subjected to dispersions of −40, 0, and +40 ps/nm are shown in FIGS. 9(A), 9(B) and 9(c), respectively, for OTDM. Similarly, waveforms (equalized waveforms) after subjected to dispersions of −40, 0, and +40 ps/nm are shown in FIGS. 10(A), 10(B) and 10(C), respectively, for NRZ. As shown, for both OTDM and NRZ, after dispersion (positive and negative) the "1" level at the center of the waveform rises but the cross points lower, from which it can be seen that the variation of intensity occurs with a cycle equal to the length of one slot time, thus creating the 40-GHz component.

Regarding point (i), above, it follows that when transmitting an optical signal whose bit rate is generally represented by B b/s and whose B-hertz component is at a minimum at zero dispersion, the amount of total dispersion can be set to zero if the control point where the B-Hz component of the received optical signal is at a minimum in the eye opening can be detected by varying the control points of a variable dispersion device, such as the amount of dispersion compensation and the signal light wavelength. Besides the B-Hz component, other frequency components such as a harmonic of the B Hz can be used to perform similar control.

Further, as is apparent from FIGS. 1 and 2, there are two maximum points, or highest peaks, at symmetrical positions on both sides of a minimum point in each of the OTDM and NRZ waveforms. Therefore, in cases where it is difficult to detect a minimum point, the amount of total dispersion can be set to zero by detecting the control points of the variable dispersion compensation device that provide the two maximum points and by taking the midpoint between them.

Further, in the case of an OTDM signal modulated by an n·m-bit/s data signal obtained by time-division multiplexing n RZ signals each amplitude-modulated by an m-bit/s signal, an m-hertz component may be extracted and the total dispersion of the transmission line may be controlled so that the m-hertz component comes to a maximum. Such control can be performed instead of extracting an n·m-hertz component and controlling the total dispersion of the transmission line so that the n·m-hertz component comes to a minimum, as described above. The reason for this is that the m-bit/s RZ signals constituting the OTDM signal each contain an m-hertz component, and as can be seen from FIGS. 3 and 4, that component is at a maximum when the amount of total dispersion is zero. More specifically, in this case, the n·m-hertz component or the m-hertz component is extracted, and the amount of total dispersion of the transmission line is controlled so that the n·m-hertz component or the m-hertz component comes to a minimum or a maximum, respectively.

Therefore, according to embodiments of the present invention, and as will be seen in more detail below, the present invention provides a method and apparatus for controlling dispersion in a transmission line. More specifically, the intensity of a specific frequency component of an optical signal transmitted through the transmission line is detected. The optical signal has an intensity v. total dispersion characteristic curve with a corresponding eye opening. See, for example, FIGS. 1 and 2. The amount of total dispersion of the transmission line is controlled to substantially minimize the intensity of the specific frequency component in the eye opening. As a result, as illustrated, for example, in FIGS. 1 and 2, the dispersion will be minimized by minimizing the intensity of the specific frequency component in the eye opening.

In actual practice, it is very difficult to measure the eye opening, so it would be difficult to determine if the intensity of a specific frequency component was actually minimized in the eye opening. As a result, the required control may be difficult to achieve.

Therefore, referring, for example, to FIGS. 1 and 2, an optical signal such as an OTDM or an NRZ signal can be described as having an intensity v. total dispersion characteristic curve with at least two peaks. The amount of total dispersion of the transmission line can then be controlled to substantially minimize the intensity of the specific frequency component between the two highest peaks of the intensity v. total dispersion characteristic curve, as illustrated, for example, in FIGS. 1 and 2.

Regarding the point (iii), above, a possible method is to vary the amount of total dispersion within a very small range at a low frequency $f_0$ around a minimum point (or maximum point), to constantly detect the point where the B-Hz component intensity is at a minimum (or maximum). The principle of this method is shown in FIGS. 11 and 12.

Figure 11:
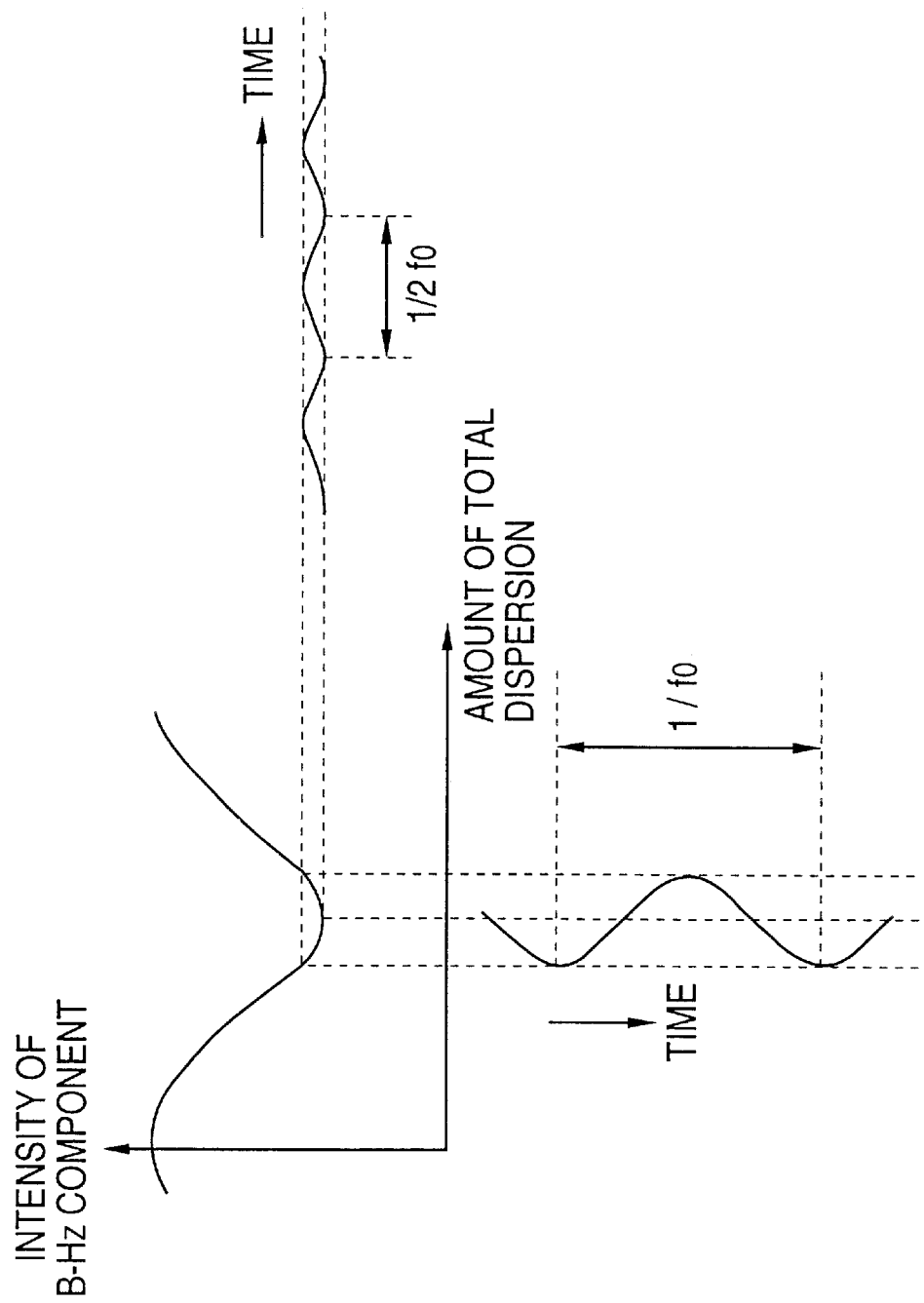
FIG. 11 is a diagram for explaining a case where the dispersion compensation amount is at a minimum in a method that changes the amount of total dispersion within a very small range at a low frequency $f_0$, according to an embodiment of the present invention.

More specifically, FIG. 11 is a diagram for explaining a case where the dispersion compensation amount is at a minimum in a method that changes the amount of total dispersion within a very small range at a low frequency $f_0$, according to an embodiment of the present invention. FIG. 12 is a diagram for explaining the case where the dispersion compensation amount deviates from the minimum, according to an embodiment of the present invention.

Referring now to FIG. 11, when the amount of dispersion compensation is at a minimum point (or maximum point), the intensity of the B-Hz component varies with time at a frequency of $2 \times f_0$ and, therefore, does not contain the frequency $f_0$ component.

Figure 12:
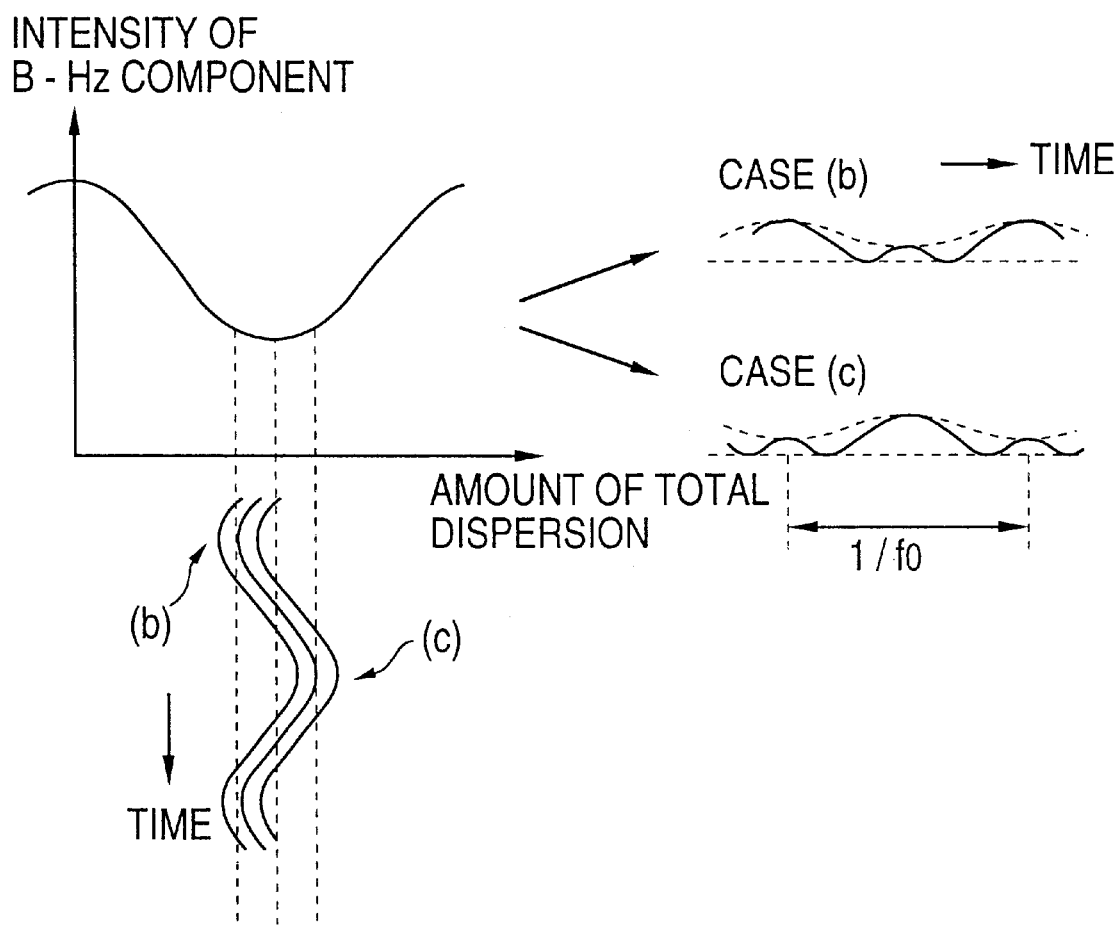
FIG. 12 is a diagram for explaining the case where the dispersion compensation amount deviates from a minimum in a method that changes the amount of total dispersion within a very small range at a low frequency $f_0$, according to an embodiment of the present invention.

From this condition, when the amount of dispersion compensation is shifted, as indicated by (b) or (c) in FIG. 12, the frequency $f_0$ component appears in the temporal change of the B-Hz component intensity, the component being opposite in sign between (b) and (c). Here, we consider detecting the frequency $f_0$ component from the B-Hz component intensity and applying feedback in such a manner as to change the amount of total dispersion in the direction that eliminates the frequency $f_0$ component. The direction of the change can be determined from the phase of the frequency $f_0$ component.

Furthermore, the amount of total dispersion can also be detected by using the characteristics shown in FIGS. 1 to 4. That is, by detecting the intensity of a specific frequency component, the amount of total dispersion can be determined from the magnitude of the intensity as related to FIGS. 1 to 4. However, since the intensity of a specific frequency component is not in a one-to-one correspondence with the amount of total dispersion, the characteristics are measured by sweeping the control points of the variable dispersion device within a given range as necessary.

The above-described dispersion equalization method and dispersion detection method can be applied not only to time-division multiplexing systems but also to wavelength-division multiplexing (WDM) systems. That is, the dispersion equalization method and dispersion detection method of the present invention can be applied for each component after demultiplexing different wavelength components.

Figure 13:
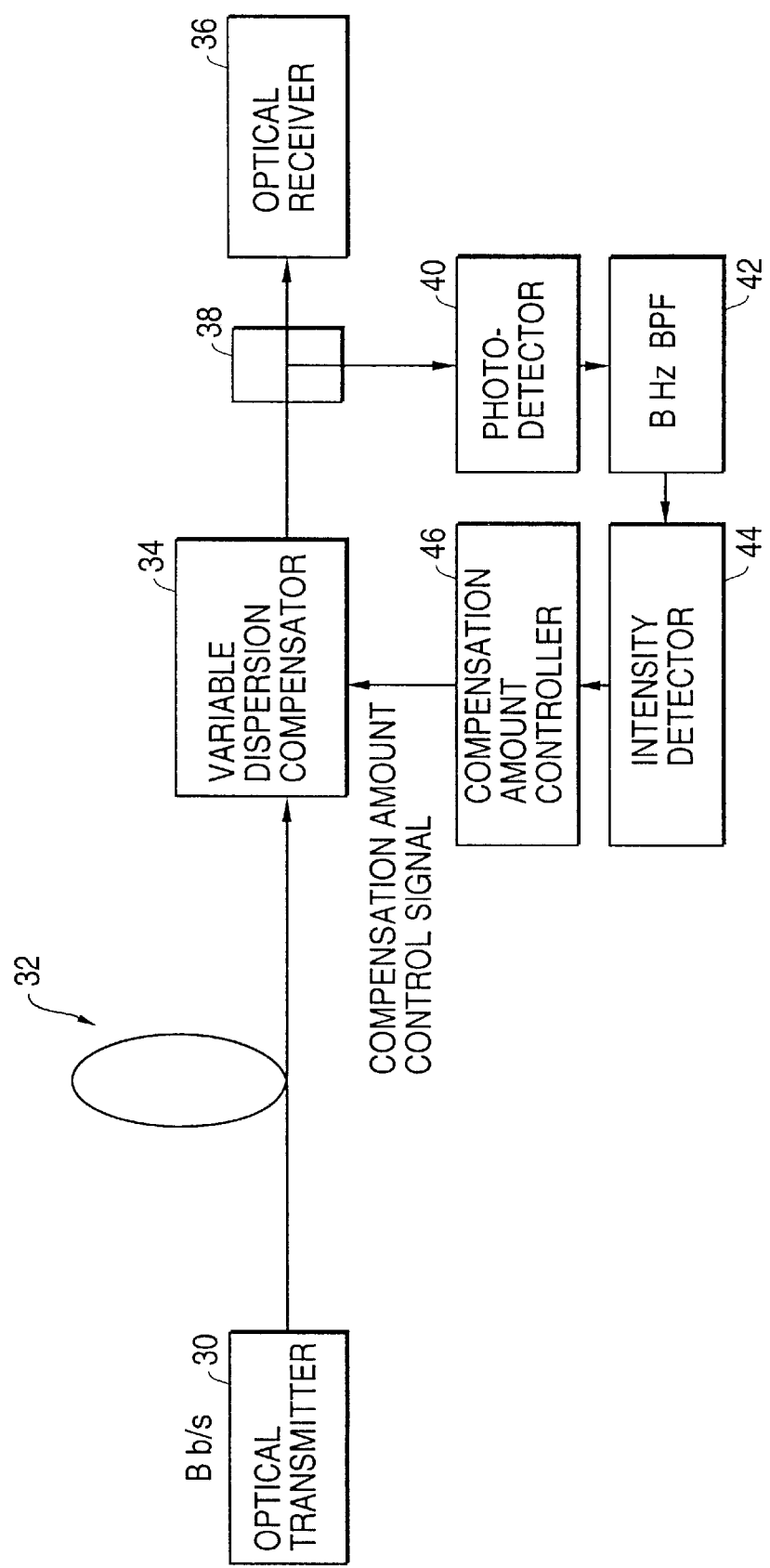
FIG. 13 is a diagram illustrating an automatic dispersion equalization system, according to an embodiment of the present invention.

FIG. 13 is a diagram illustrating an automatic dispersion equalization system, according to an embodiment of the present invention. Referring now to FIG. 13, an optical signal of bit rate B b/s from an optical transmitter 30 is transmitted through an optical transmission line (SMF) 32 and is input into an optical receiver 36 via a variable dispersion compensator 34. A portion of the optical signal input to optical receiver 36 is separated by an optical coupler 38 and converted by a photodetector 40 into an electrical signal. From the output of photodetector 40, a B-Hz component is extracted by a band-pass filter 42 whose center frequency is B Hz, and the intensity of that component is detected by an intensity detector 44. A compensation amount controller 46 controls the compensation amount in the variable dispersion compensator 34 in a direction that brings the B-Hz component to a maximum for an RZ signal or in a direction that brings the B-Hz component to a minimum for an OTDM or an NRZ waveform. Here, the variable dispersion compensator 34 is located at the receiving end, but the same control can be performed if it is placed at some other location, for example, at the transmitting end or in a linear repeater. Further, in the case of an OTDM signal multiplexing n m-b/s RZ signals, the m-hertz component may be brought to a maximum instead of bringing the mn-hertz component to a minimum.

Figure 14:
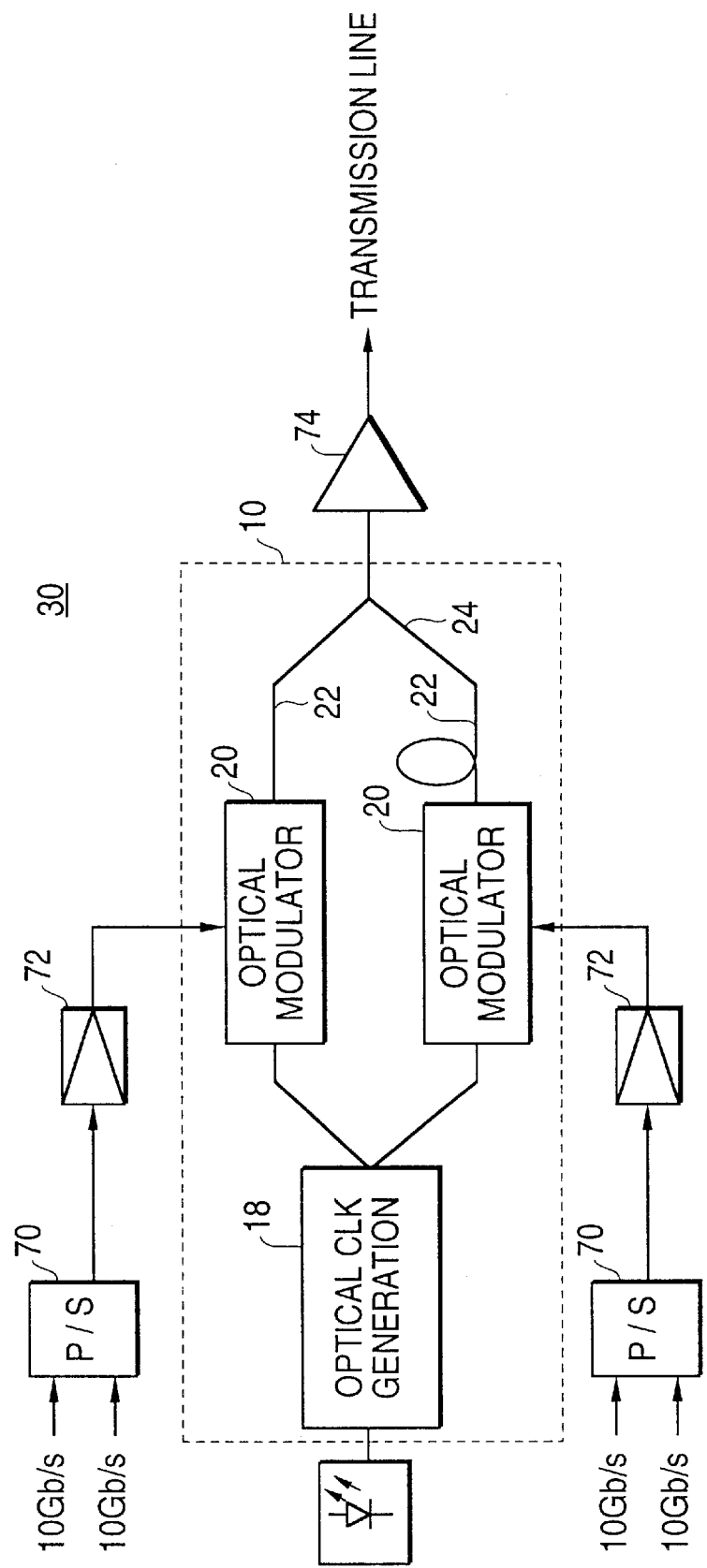
FIG. 14 is a diagram illustrating a specific example of an optical transmitter of the automatic dispersion equalization system of FIG. 13, according to an embodiment of the present invention.

FIG. 14 is a diagram illustrating a specific example of optical transmitter 30 in FIG. 13, according to an embodiment of the present invention. Referring now to FIG. 14, in optical transmitter 30, OTDM modulator 10 of FIG. 5 is used as an optical modulator for generating an optical signal.

Figure 16:
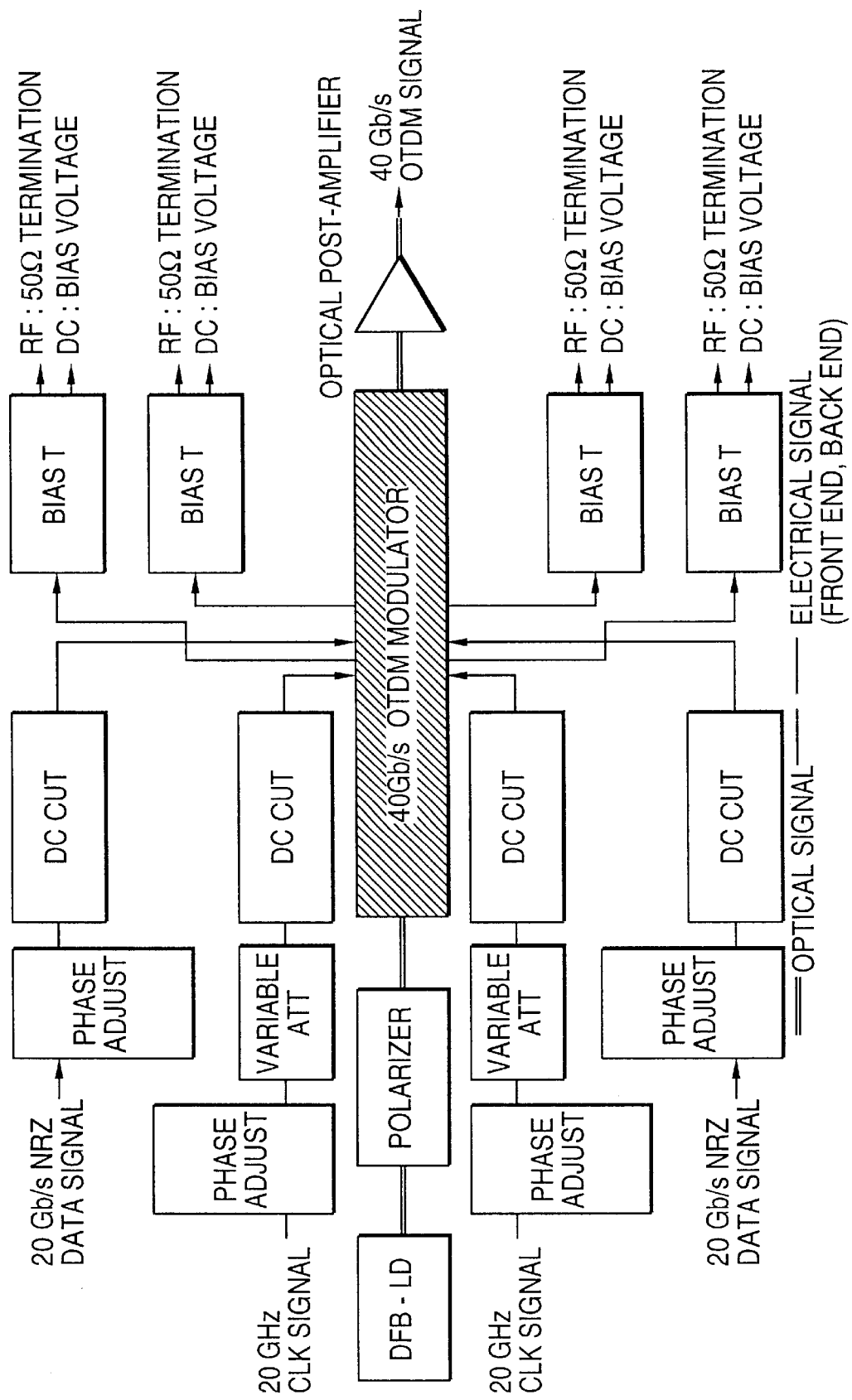
FIG. 16 is a diagram of an optical transmitter, according to an embodiment of the present invention.

In this example, two 10-Gb/s data signals input in parallel are converted by a parallel/serial converter 70 to obtain one 20-Gb/s NRZ signal. This 20-Gb/s NRZ signal is input to a driver 72 to obtain a 20-Gb/s drive signal for driving an optical modulator 20. The output (20-Gb/s RZ optical signal) of each optical modulator 20 is phase-adjusted by a phase adjuster 22 (the phase is shifted so that the phase difference of the light becomes 180°), after which the thus adjusted signals are combined together by an optical multiplexer 24 (optical coupler) to obtain a 40-Gb/s optical signal of NRZ format, which is then sent out on a transmission line via an optical post-amplifier 74. A more detailed circuit diagram of an optical transmitter according to an embodiment of the present invention is shown in FIG. 16.

Figure 15:
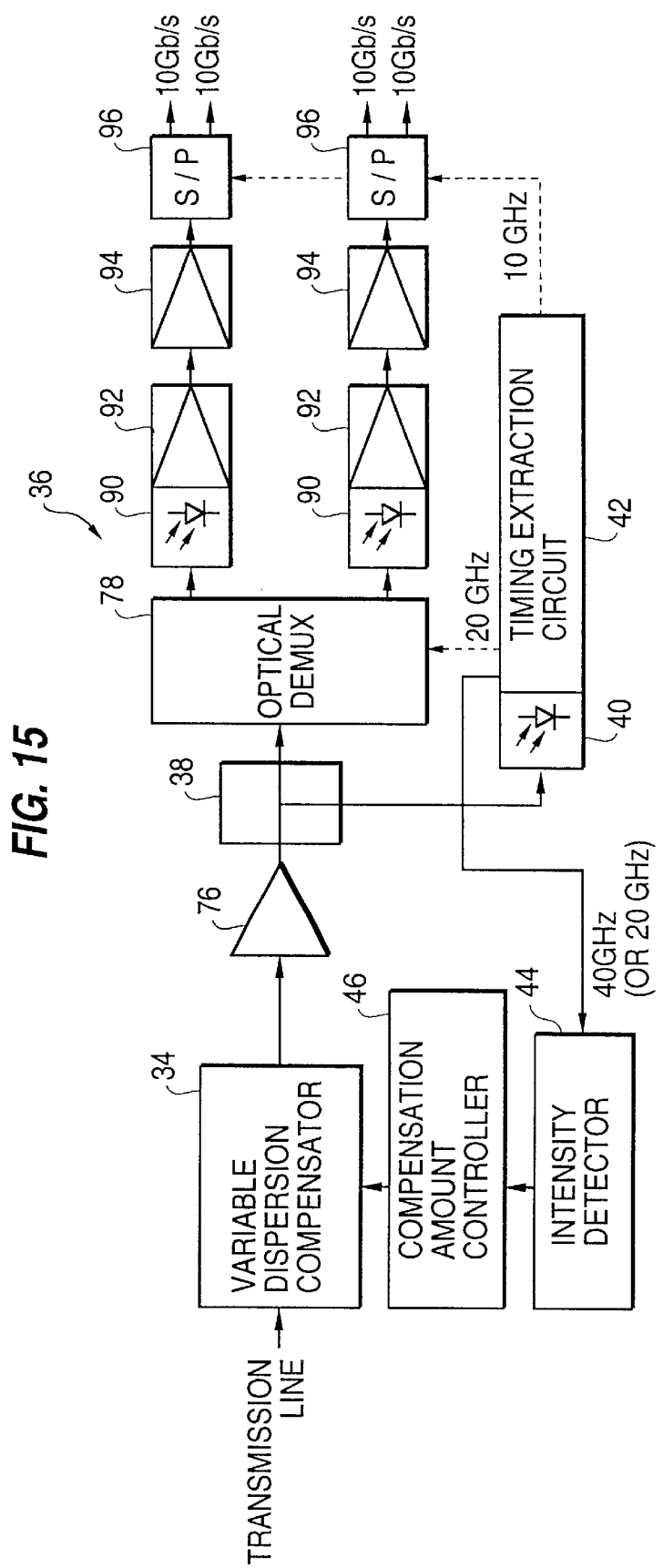
FIG. 15 is a diagram illustrating a specific example of an optical receiver of the automatic dispersion equalization system of FIG. 13, according to an embodiment of the present invention.

FIG. 15 is a diagram illustrating a specific example of optical receiver 36 in FIG. 13, according to an embodiment of the present invention. Referring now to FIG. 15, the 40-Gb/s optical signal is input into an optical DEMUX 78 via the variable dispersion compensator 34, optical preamplifier 76, and beam splitter 38.

Figure 17:
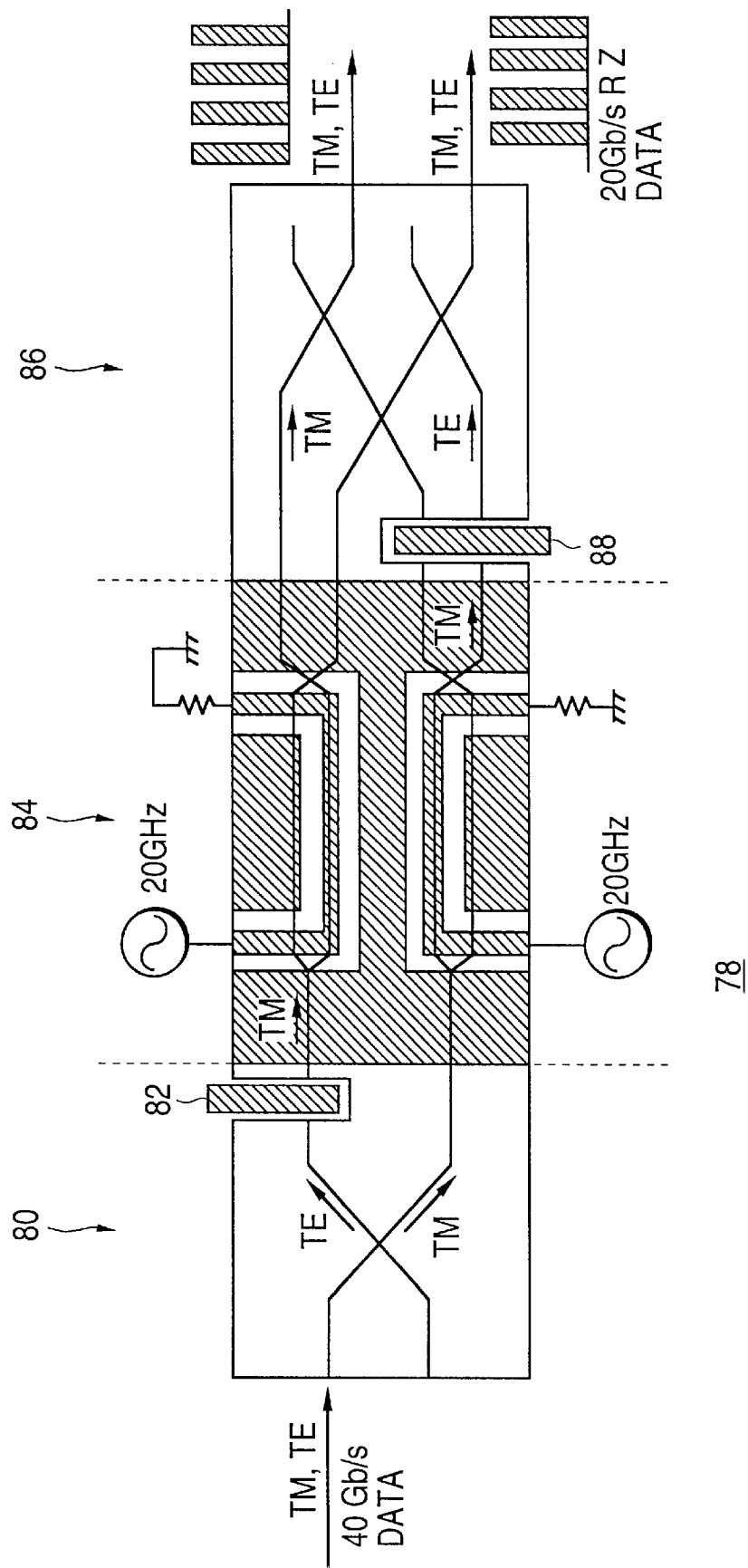
FIG. 17 is a diagram illustrating a polarization-independent demultiplexer (DEMUX), according to an embodiment of the present invention.

A polarization-independent optical DEMUX shown in FIG. 17 can be used as optical DEMUX 78. More specifically, FIG. 17 shows a structural diagram of the polarization-independent optical DEMUX 78, according to an embodiment of the present invention. Polarization independence is required of the optical DEMUX placed at the receiving end. For that purpose, the 40-Gb/s OTDM signal input after transmission through the fiber is first split, according to polarization, into TE and TM components by a crossed waveguide polarization splitter 80 at the first stage. Here, crossing length is optimized so that a polarization extinction ratio of 20 dB or more can be obtained. Next, using a 1×2 switch 84 which is driven by a 20-GHz sinusoidal signal, each mode is optical time-division demultiplexed into 20-Gb/s optical RZ signals. At this time, the two outputs of each 1×2 switch are in a complementary relationship to each other. However, generally, in an LN switch (modulator), modulation efficiency is greater for the TM mode than for the TE mode. Therefore, in the illustrated device, the TE mode light after polarization splitting is converted by a half-wave plate 82 into TM mode light which is then subjected to optical demultiplexing. At the final stage, the same bit sequences are combined together using two polarization beam combiners. Here, if the beams of the same TM mode were combined together, beam interference would occur, as in the case of the previously described OTDM modulator. Therefore, the 1×2 switch 84 where the TE/TM mode conversion is not performed is followed by a half-wave plate 88 which performs TM/TE mode conversion, and thereafter, powers of cross polarization components are combined.

Figure 18:
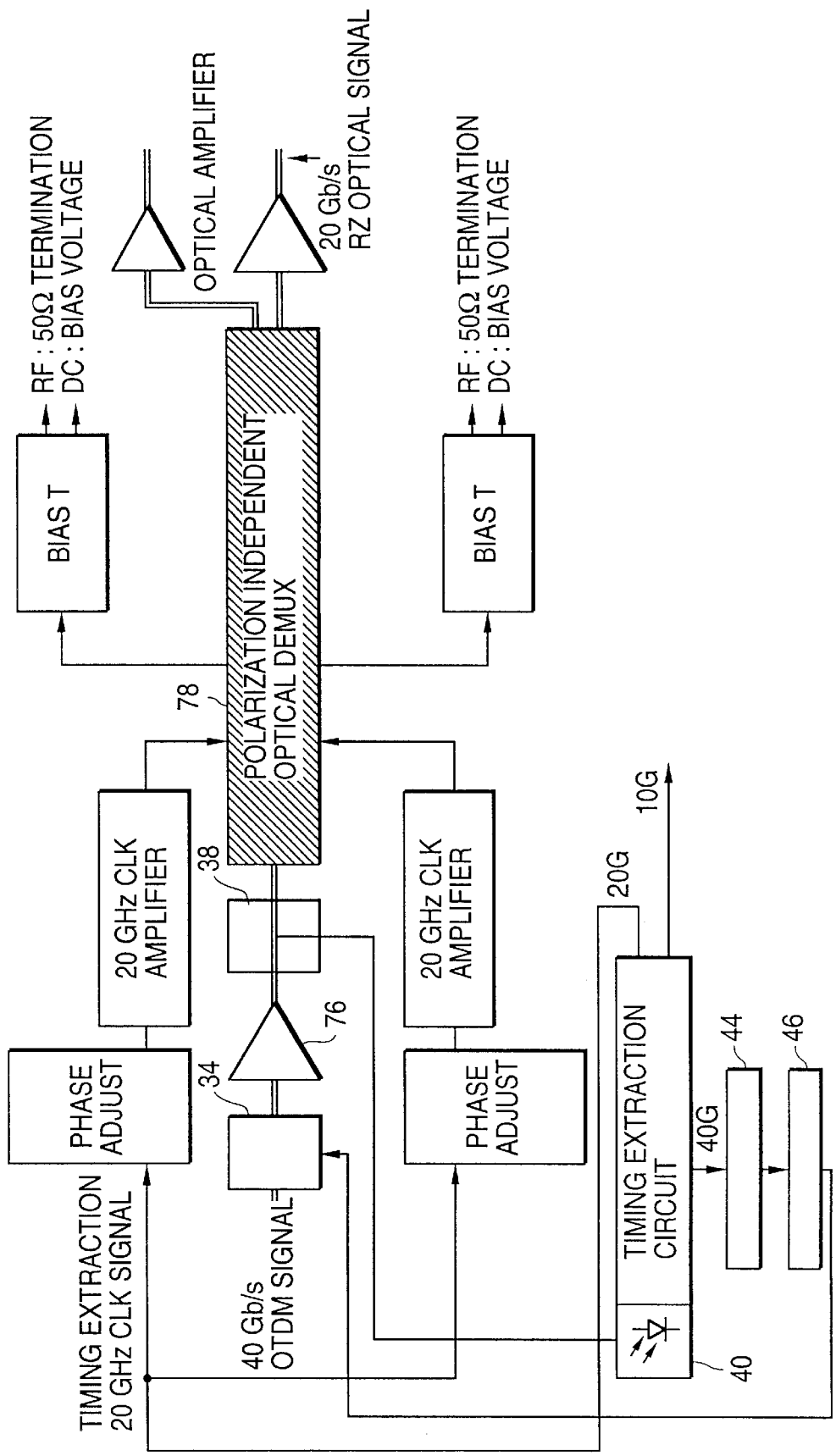
FIG. 18 is a diagram of a portion of an optical receiver, according to an embodiment of the present invention.

Referring again to FIG. 15, the two 20-Gb/s optical RZ signals obtained from optical DEMUX 78 are each input to a photodiode 90 for conversion into an electrical signal, which is then amplified by a preamplifier 92 and waveshaped by an equalizing amplifier 94. The waveshaped signal is then reconstructed by a serial/parallel converter 96 into the original 10-Gb/s NRZ data. After that, the data is reproduced by a 10-Gb/s discriminator (not illustrated). A more detailed circuit diagram of optical receiver 36, up to the optical demultiplexing section, is shown, for example, in FIG. 18.

Figure 19:
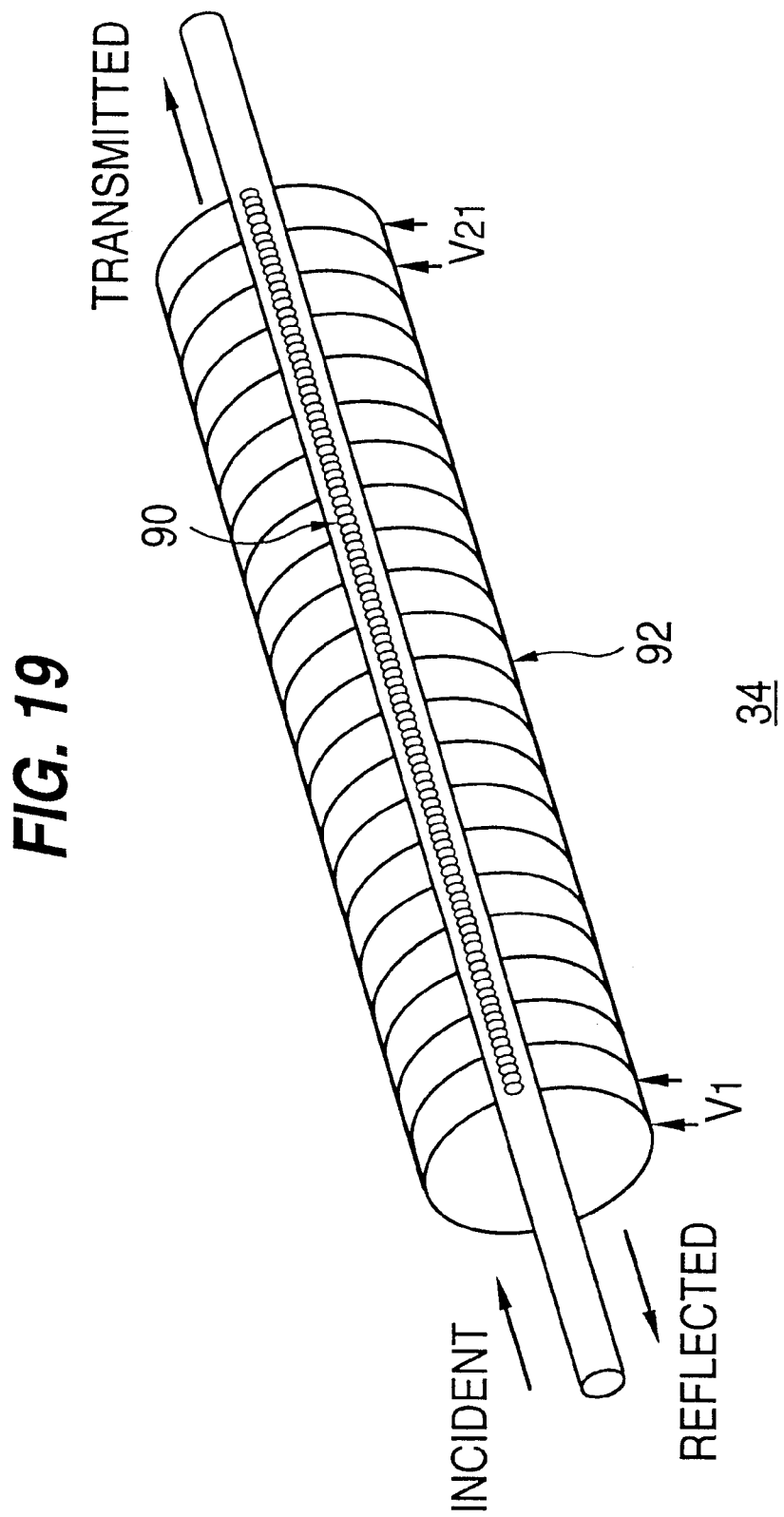
FIG. 19 is a diagram illustrating a variable dispersion compensator, according to an embodiment of the present invention.

FIG. 19 is a diagram illustrating an example of a variable dispersion compensator, according to an embodiment of the present invention. See also, M. M. Ohm et al., "Tunable fiber grating dispersion using a piezoelectric stack, OFC '87 Technical Digest, WJ3, pp. 155–156, which is incorporated herein by reference.

Figure 20:
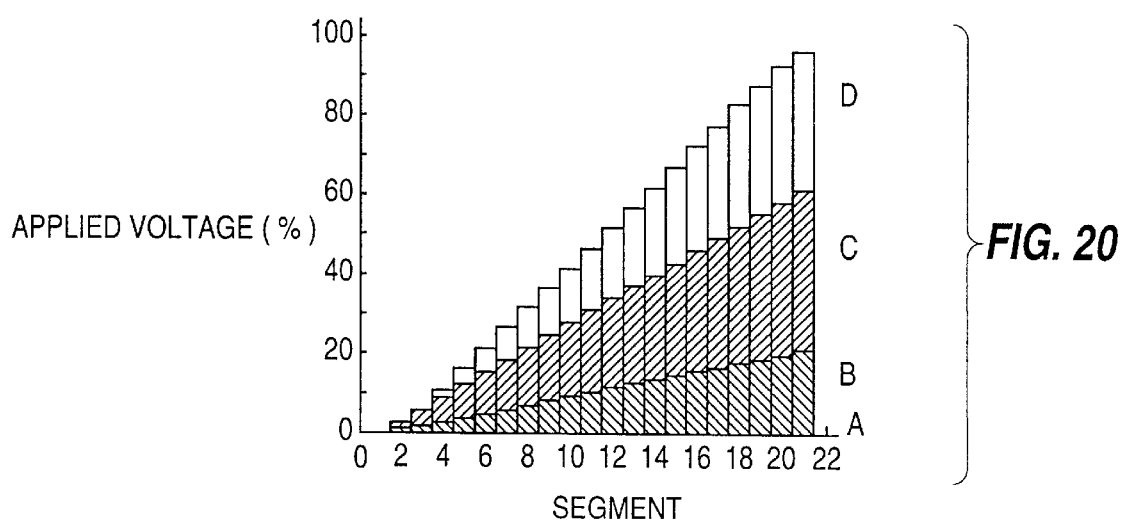
FIG. 20 is a graph illustrating patterns A to D of voltages $V_1$ to $V_{21}$ applied to segments of the variable dispersion compensator of FIG. 19, according to an embodiment of the present invention.

FIG. 20 is a graph illustrating patterns A to D of voltages $V_1$ to $V_{21}$ applied to segments of the variable dispersion compensator in FIG. 19, according to an embodiment of the present invention. Moreover, FIG. 21 is a graph illustrating dispersion values for the voltage patterns A to D in FIG. 20, according to an embodiment of the present invention.

Figure 21:
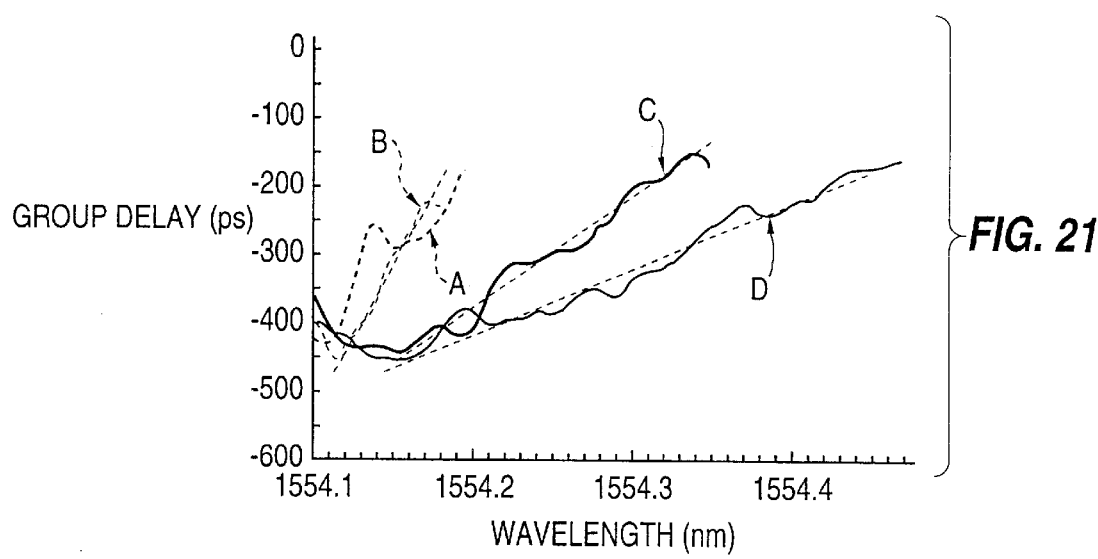
FIG. 21 is a graph illustrating dispersion values for the voltage patterns A to D in FIG. 20, according to an embodiment of the present invention.

Referring now to FIGS. 19, 20 and 21, a piezoelectric element 92 is attached to each of twenty-one (21) segments of a chirped fiber grating 90 (see FIG. 19). When voltages $V_1$ to $V_{21}$, with a gradient as shown in FIG. 20, are applied to the piezoelectric elements, the pressure being applied in the longitudinal direction of the grating 90 changes, and for the voltage patterns A to D shown in FIG. 20, the dispersion values (slopes of the lines) change as shown in FIG. 21.

Figure 22:
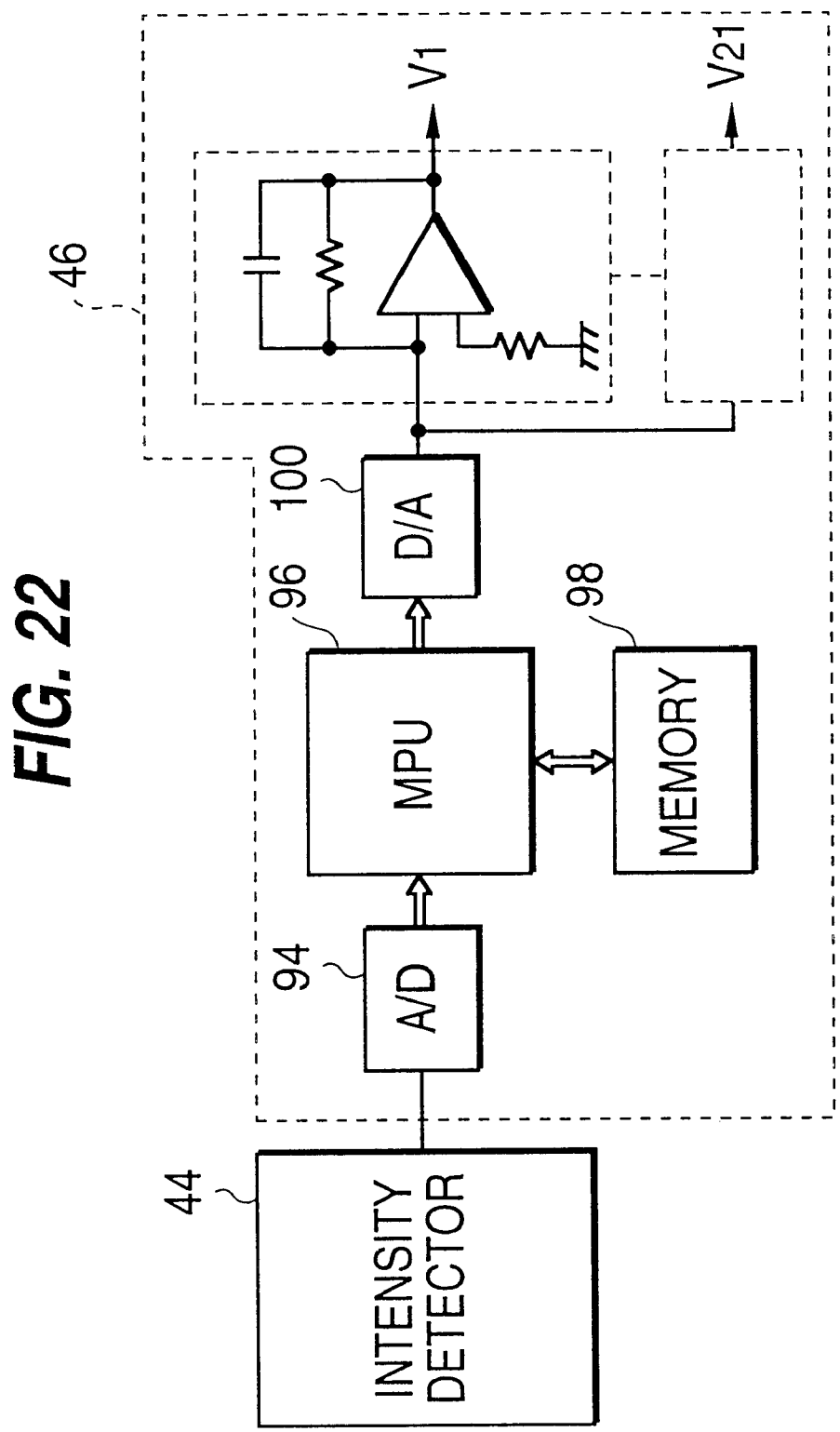
FIG. 22 is a diagram illustrating a compensation amount controller, according to an embodiment of the present invention.

FIG. 22 is a diagram illustrating an example of compensation amount controller 46 (see FIG. 13), according to an embodiment of the present invention. Referring now to FIG. 22, the intensity value of the 40-Gb/s frequency component is A/D converted by an A/D converter 94 and input as a digital signal to an MPU 96. MPU 96 compares the present intensity value Ic with the previously received intensity value Ip stored in a memory 98, and checks to determine whether the relationship between the present dispersion amount and the intensity of the 40-Gb/s is on the X slope or Y slope in FIG. 2. That is, when it is on the X slope, the amount of dispersion will tend to zero (Z point) if the dispersion amount of the variable dispersion compensator 34 is reduced. When it is on the Y slope, the amount of dispersion will tend to zero if the dispersion amount of the variable dispersion compensator 34 is increased. Therefore, when Ic>Ip, it is assumed that the relationship is on the X slope, and to control the voltages applied to the variable dispersion compensator 34 of FIG. 19, such values of $V_1$ to $V_{21}$ that cause the dispersion amount to decrease are obtained, and the voltages to be applied to the respective piezoelectric elements are output via a D/A converter 100. Conversely, when Ic<Ip, it is assumed that the relationship is on the Y slope, and such values of $V_1$ to $V_{21}$ that cause the dispersion amount to increase are obtained to control the voltages applied to the variable dispersion compensator 34 of FIG. 19.

Here, to obtain the values of $V_1$ to $V_{21}$, the data shown in FIGS. 20 and 21 (the data representing the relationship between the dispersion amount and the $V_1$ to $V_{21}$) and the data shown in FIG. 2 (the data representing the relationship between the intensity of the 40-GHz component and the amount of total dispersion) are stored in memory in advance. Then, it is determined whether the relationship is on the X slope or Y slope in FIG. 2, and the present dispersion amount Ic is obtained from the data shown in FIG. 2. Next, a dispersion amount Ic' necessary for compensation in the variable dispersion compensator 34 in order to reduce the amount of dispersion to zero at Z point is determined from the present dispgersion amount Ic. That is, Ic' is determined so that Ic+Ic'=0.

Once Ic' is determined in this way, the $V_1$, to $V_{21}$ to be applied to variable dispersion compensator 34 in order to obtain Ic' are determined based on the data shown in FIGS. 20 and 21.

Figure 23:
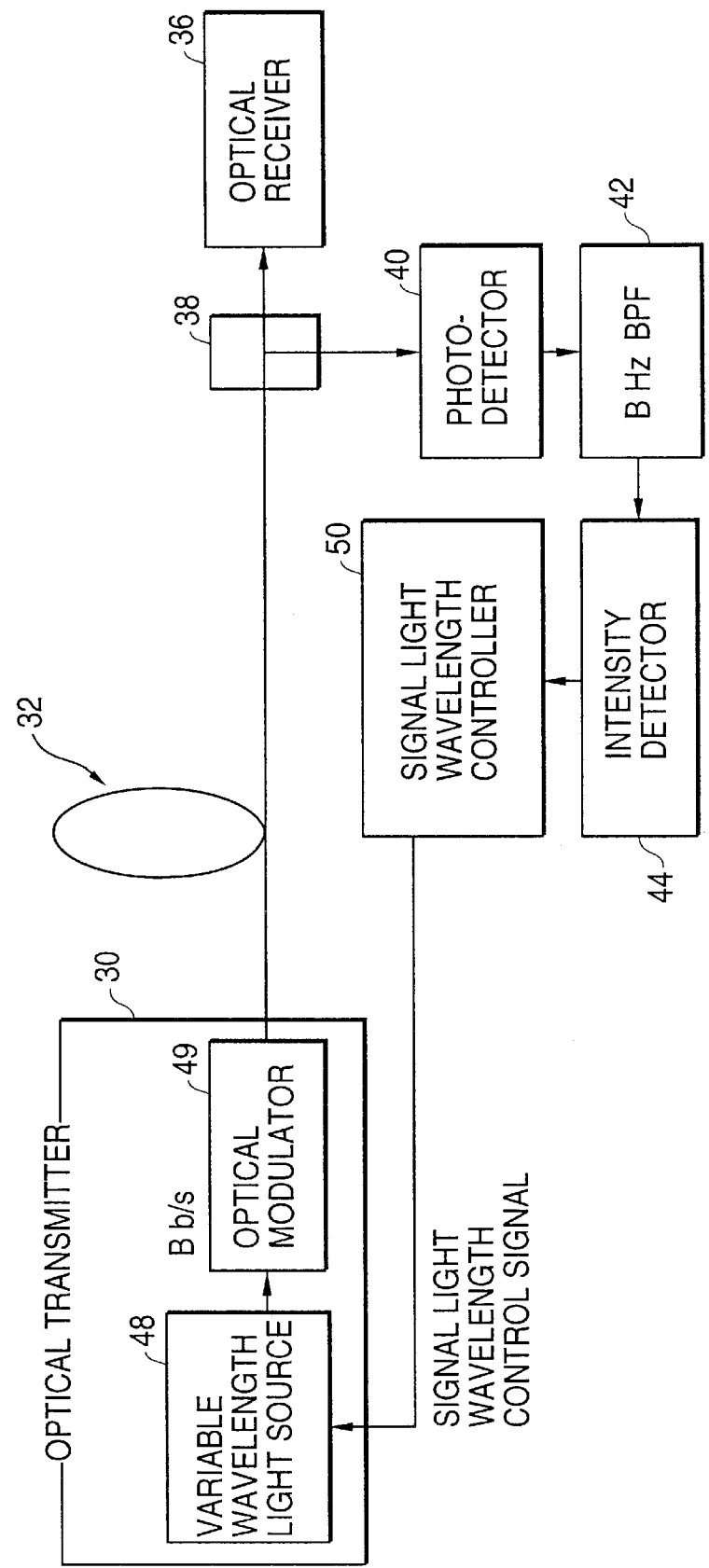
FIG. 23 is a diagram illustrating a modification of the automatic dispersion equalization system of FIG. 13, according to an embodiment of the present invention.

FIG. 23 is a diagram illustrating a modification of the system in FIG. 13, according to an embodiment of the present invention. Referring now to FIG. 23, variable dispersion compensator 34 in the system of FIG. 13 is replaced by a variable wavelength light source 48, and the amount of chromatic dispersion of the optical transmission line 32 is controlled by controlling signal light wavelength using a signal light wavelength controller 50.

Figure 24:
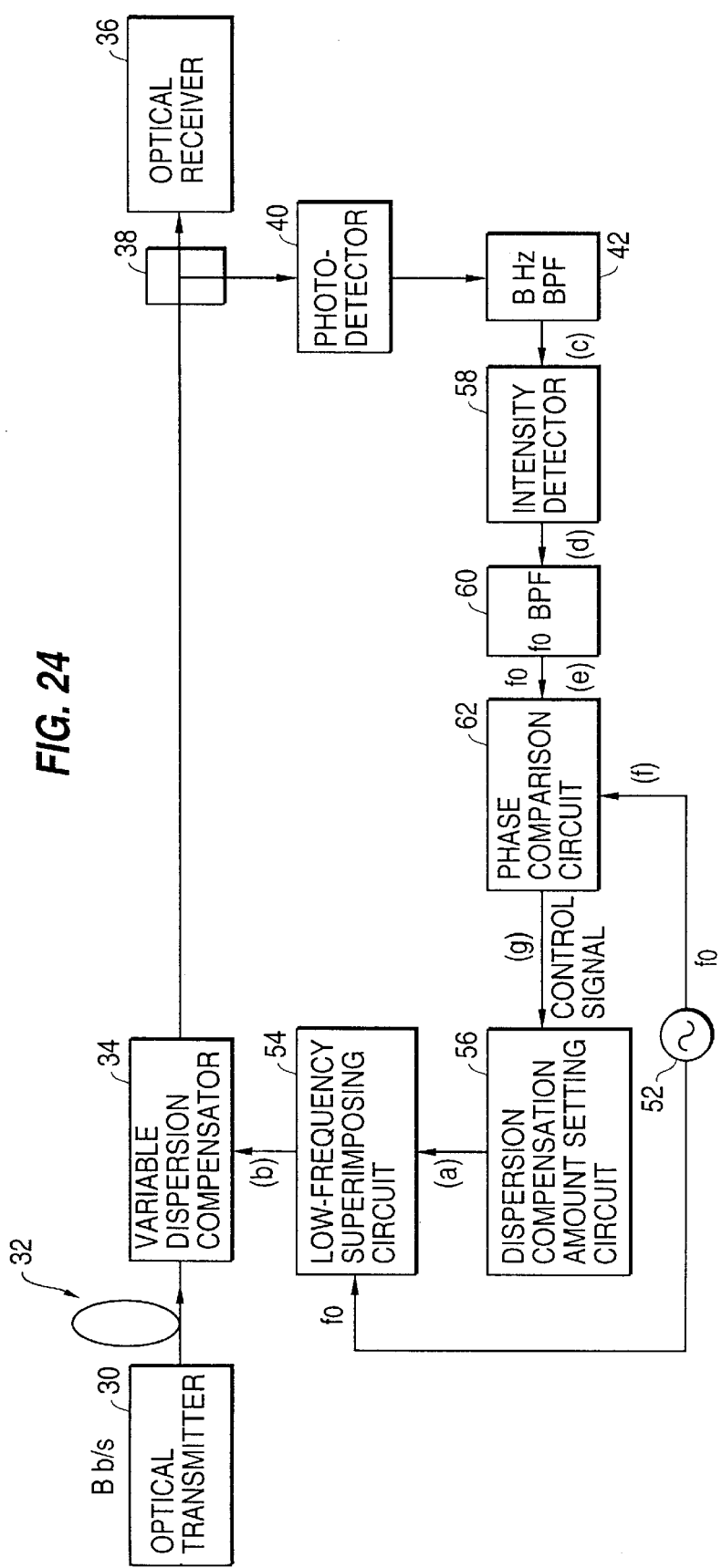
FIG. 24 is a diagram illustrating a detailed configuration of the automatic dispersion equalization system of FIG. 13, according to an embodiment of the present invention.

FIG. 24 is a diagram illustrating another example of the system of FIG. 13, according to an embodiment of the present invention. Referring now to FIG. 13, an oscillator 52 generates a sine wave of low frequency $f_0$. The low frequency signal generated by oscillator 52 is superimposed in a low-frequency superimposing circuit 54 onto a compensation amount setting signal from a dispersion compensation amount setting circuit 56, and the resulting signal is supplied to variable dispersion compensator 34. The intensity of the B-Hz component output from band-pass filter 42 is detected by an intensity detector 58 (for example, a square-law detector), and from the detector output, the $f_0$ component is extracted by a band-pass filter 60. The phase of the $f_0$ component extracted by band-pass filter 60 is compared in a phase comparison circuit 62 with the phase of the low frequency signal output from oscillator 52. Based on the result of the comparison from phase comparison circuit 62, dispersion compensation amount setting circuit 56 generates and outputs the compensation amount setting signal. Intensity detector 58 is implemented, for example, using a multiplier, or a mixer, or a conventional power detector. Phase comparison circuit 62 is implemented, for example, using a multiplier, or a mixer, or a full-wave rectifier, and a low-pass filter.

FIGS. 25(A), 25(B), 25(C), 25(D), 25(E), 25(F) and 25(G) are waveform diagrams for explaining the operation of the system of FIG. 24, according to an embodiment of the present invention. More specifically, FIGS. 25(A), 25(B), 25(C), 25(D), 25(E), 25(F) and 25(G) are waveform diagrams showing signal waveforms at the points indicated by (a), (b), (c), (d), (e), (f) and (g), respectively, in FIG. 24.

Figure 25:
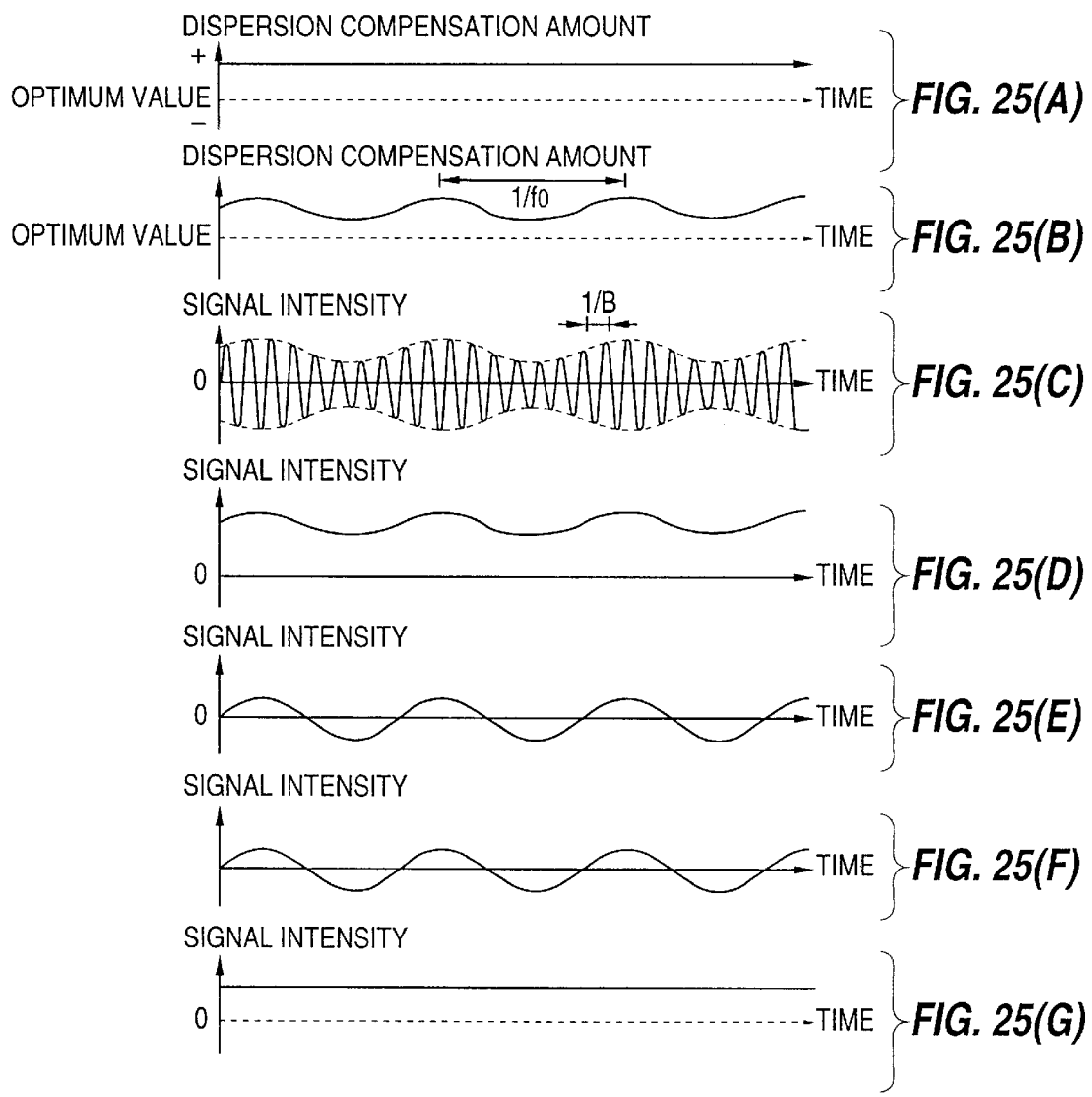
FIGS. 25(A), 25(B), 25(C), 25(D), 25(E), 25(F) and 25(G) are waveform diagrams for explaining the operation of the automatic dispersion equalization system of FIG. 24, according to an embodiment of the present invention.

When the dispersion compensation amount is shifted from the optimum value into the positive side, as shown in FIG. 25(A), the output of the low-frequency superimposing circuit 54 will be as shown in FIG. 25(B). When the dispersion compensation amount is shifted from the optimum value into the positive side, in the case of NRZ or OTDM, the B-Hz component intensity increases as the dispersion compensation amount increases (see FIGS. 1, 2, and 12), so that the amplitude of the B-Hz component extracted by the bandpass filter 42 changes at the frequency $f_0$, as shown in FIG. 25 (C)

When the intensity of that component is detected (see FIG. (D)), and the $f_0$, component is extracted (see FIG. 25(E)), the resulting signal is in phase with the low frequency signal (see FIG. 25(F)) output from oscillator 52. Hence, phase comparison circuit 62 outputs a positive signal (see FIG. 25(G)).

The dispersion compensation amount is brought closer to the optimum value by applying feedback control to the positive output signal in such a manner as to lower the dispersion compensation amount control signal (see FIG. 25(A)) output from dispersion compensation amount setting circuit 56. When the dispersion compensation amount is lower than the optimum value, the output of band-pass filter 60 is opposite in phase with respect to the output of oscillator 52, and a negative voltage is output from phase comparison circuit 62.

Therefore, by applying feedback control to the negative output signal in such a manner as to increase the dispersion compensation amount signal, the dispersion compensation amount is caused to change toward the optimum value. In the case of an RZ signal, the direction of change of the dispersion compensation amount should be reversed from that described above.

Figure 26:
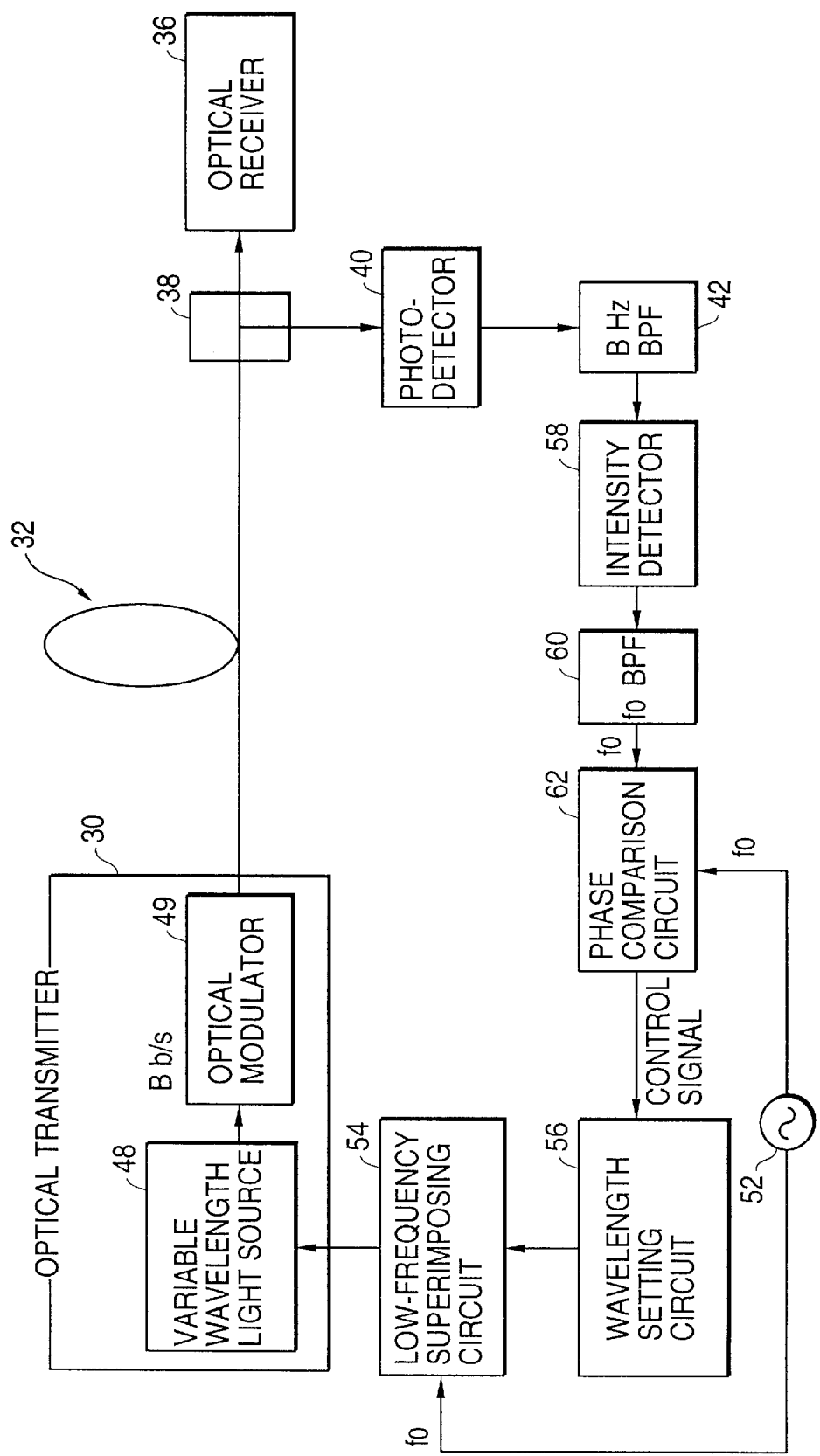
FIG. 26 is a diagram illustrating a modification of the automatic dispersion equalization system of FIG. 24, according to an embodiment of the present invention.

FIG. 26 is a diagram illustrating a modification of the system of FIG. 24, according to an embodiment of the present invention. As in the modification of FIG. 13 shown in FIG. 23, FIG. 26 is the same as FIG. 24 except that control of the dispersion compensation amount by variable dispersion compensator 34 is replaced by control of the wavelength by variable wavelength light source 48.

However, this method requires that the detection signal obtained from the phase comparison at the receiving end be transmitted to the transmitting end. This can be done, for example, by separately providing a low-speed line or by carrying information in a signal transmitted in the opposite direction.

Figure 27:
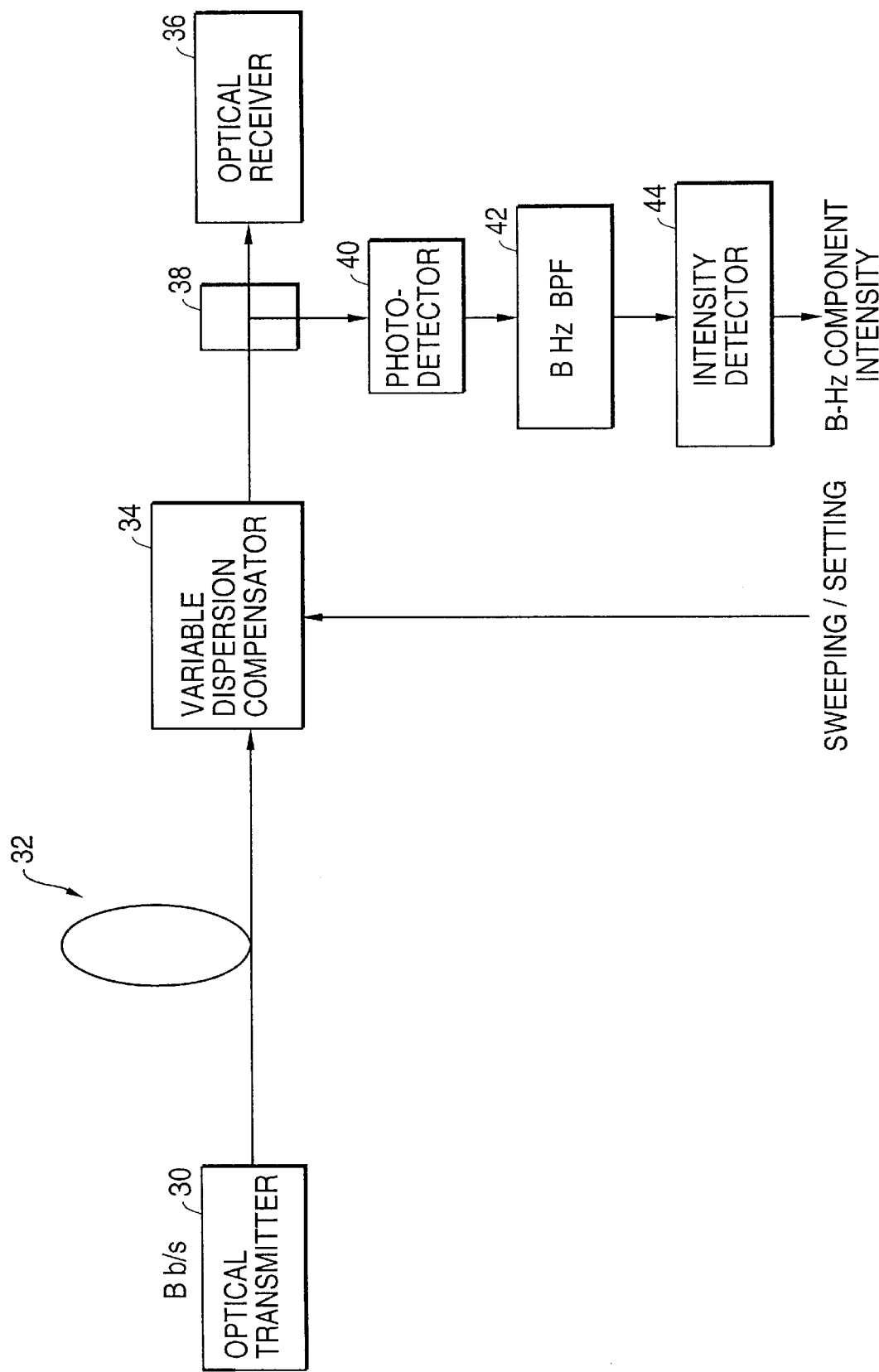
FIG. 27 is a diagram illustrating an example of a dispersion equalization system, according to an embodiment of the present invention.

FIG. 27 is a diagram illustrating an additional example of a dispersion equalization system, according to an additional embodiment of the present invention. The previous examples assumed a case where dispersion value control is performed while allowing the system to remain in service. By contrast, in FIG. 27, it is assumed that control is applied when starting the system or when restarting the system in the event that automatic dispersion equalization control has shifted significantly from the optimum point, or where dispersion amount optimization is performed by intentionally interrupting the system operation.

The dispersion compensation amount of variable dispersion compensator 34 is swept over a wide range, and while this is being done, the change of the B-Hz component is detected from the output of intensity detector 44. As previously described, the amount of total dispersion can be detected by comparing the intensity characteristic of the B-Hz component with the characteristics shown in FIGS. 1 to 4. In the case of an RZ signal, the dispersion compensation amount with which the B-Hz component is at a maximum is recorded, and after sweeping the compensation amount, the dispersion compensation amount is set to the recorded value before starting the system operation. In the case of an OTDM or NRZ waveform, two dispersion compensation amounts with which the B-Hz component is at a maximum, for example, are recorded, and after sweeping the compensation amount, the dispersion compensation amount is set to the midpoint between the two values.

Figure 28:
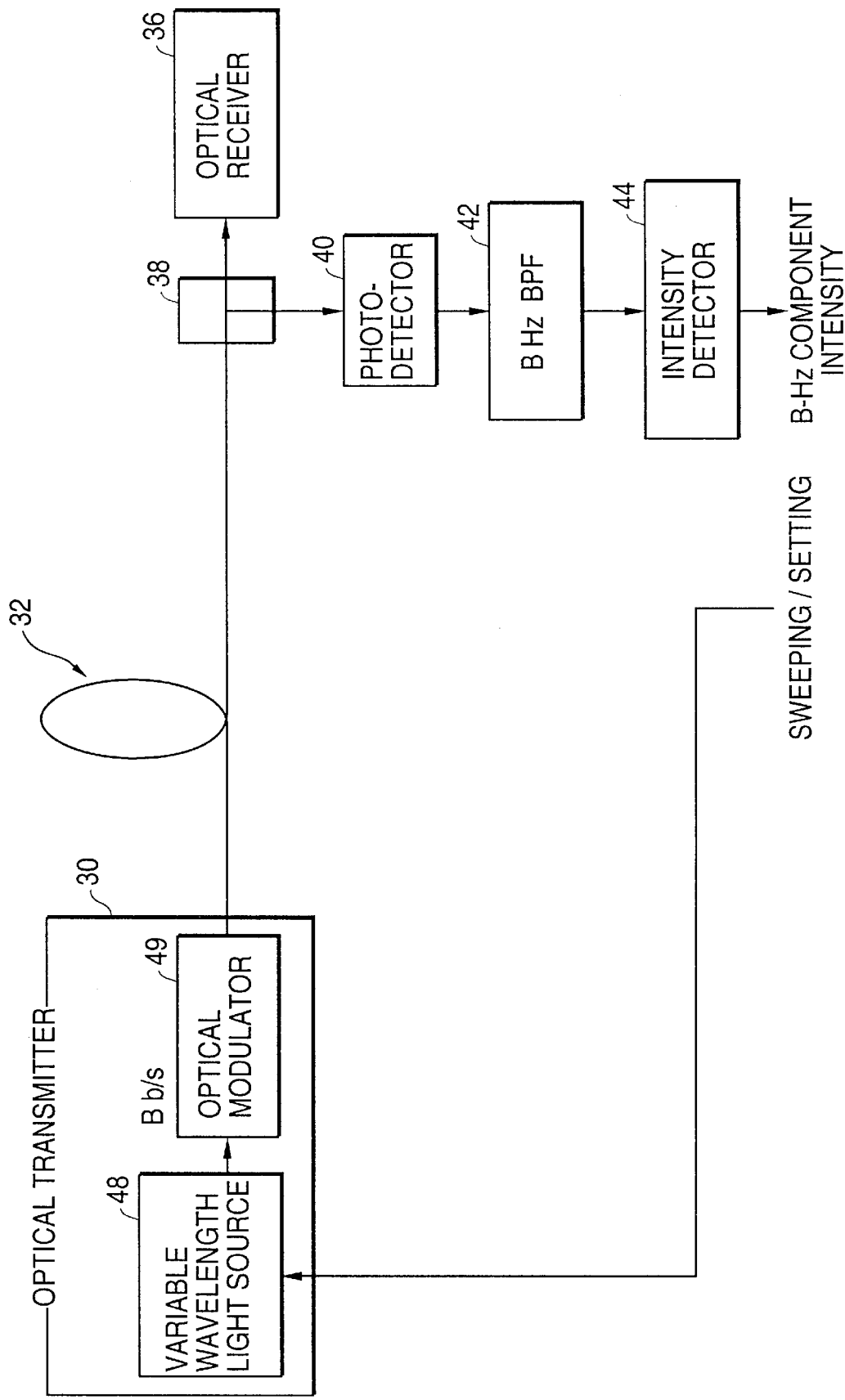
FIG. 28 is a diagram illustrating a modification of the dispersion equalization system of FIG. 27, according to an embodiment of the present invention.

FIG. 28 is a diagram illustrating a modification of the system of FIG. 27, according to an embodiment of the present invention. This modification is the same as that shown in FIG. 27, except that the sweeping and setting of variable dispersion compensator 34 in FIG. 27 is replaced by the waveform sweeping and setting of variable wavelength light source 48.

Therefore, according to embodiments of the present invention, a method and apparatus is provided for controlling dispersion in an optical fiber transmission line. More specifically, the intensity of a specific frequency component of an optical signal transmitted through the transmission line is detected. The optical signal has an intensity v. total dispersion characteristic curve with a corresponding eye opening. The amount of total dispersion of the transmission line is controlled to substantially minimize the intensity of the specific frequency component in the eye opening. As a result, the total dispersion will be minimized as indicated, for example, by FIGS. 1 and 2.

Moreover, according to embodiments of the present invention, various types of optical signals as transmitted through a transmission line can be described as having an intensity v. total dispersion characteristic curve with at least two peaks. The amount of total dispersion of the transmission line can then be controlled to substantially minimize the intensity of the specific frequency component between the two highest peaks of the intensity v. total dispersion characteristic curve, as illustrated, for example, in FIGS. 1 and 2.

While is it preferable to minimize the intensity of the specific frequency component in the eye opening, in some circumstances it may be appropriate to simply cause the intensity to be inside the eye opening. For example, in some systems, the total dispersion corresponding to the intensity being inside the eye opening would be considered to be relatively low. Therefore, referring to FIGS. 1 and 2, the total dispersion can be controlled to simply maintain the intensity along a point on the intensity v. total dispersion characteristic curve which is inside the eye opening.

Therefore, according to embodiments of the present invention, the intensity of a specific frequency component of an optical signal transmitted through the transmission line is detected. The optical signal has an intensity v. total dispersion characteristic curve with a corresponding, overlapping eye opening. The amount of dispersion of the transmission line is controlled to maintain the intensity of the specific frequency component along a point on the intensity v. total dispersion characteristic curve which is within the eye opening.

Further, instead of controlling the dispersion to control the intensity of a specific frequency component, the intensity of the specific frequency component can simply be directly controlled. For example, the intensity can be controlled to substantially minimize the detected intensity in the eye opening.

Moreover, as previously described, it is often difficult to measure the eye opening. Therefore, the intensity of the specific frequency component can be controlled to substantially minimize the detected intensity between the two highest peaks of the intensity v. total dispersion characteristic curve.

As described above, according to embodiments of the present invention, it becomes possible to monitor and control transmission line dispersion for optical signals, such as NRZ and OTDM waveforms, whose clock component is at a minimum at zero dispersion, and transmission line dispersion can be controlled without interrupting system operation.

Therefore, according to embodiments of the present invention, transmission line dispersion is controlled for an optical signal whose clock component intensity does not become the greatest at zero dispersion, as in an NRZ signal or in an OTDM signal where a plurality of RZ signals are time-division multiplexed with their tails overlapping each other.

Therefore, according to embodiments of the present invention, chromatic dispersion is controlled in a transmission line transmitting an optical signal modulated by a data signal. More specifically, the intensity of a specific frequency component is detected from the optical signal transmitted through the transmission line. The amount of total dispersion of the transmission line is controlled so that the intensity of the detected specific frequency component becomes a minimum in the eye opening.

In addition, according to embodiments of the present invention, an apparatus and method are provided for detecting an amount of dispersion in a transmission line transmitting an optical signal modulated by a data signal. More specifically, the intensity of a specific frequency component is detected from the optical signal transmitted through the transmission line. The amount of total dispersion of the transmission line is determined from the intensity of the detected specific frequency component.

Further, according to embodiments of the present invention, a time-division multiplexed optical signal, modulated by an n·m-bit/second data signal obtained by time-division multiplexing n optical signals each amplitude-modulated by an m-bit/second data signal, is transmitted through the optical fiber transmission line. An n·m-hertz or an m-hertz frequency component is extracted from the time-division multiplexed optical signal received from the optical fiber transmission line. Dispersion in the optical fiber transmission line is made variable so that the extracted n·m-hertz or m-hertz frequency component exhibits a minimum value or a maximum value, respectively.

According to embodiments of the present invention, the intensity of a specific frequency component is "substantially" minimized. It is preferable to set the intensity at the actual minimum value. However, in practice, it is often difficult to completely minimize the intensity of a specific frequency component. Therefore, in most situations, the intensity of the specific frequency component could be considered to be substantially minimized if it is greater than or equal to the minimum intensity and less than or equal to 120% of the minimum intensity. Preferably, the intensity should be controlled to be greater than or equal to the minimum intensity and less than or equal to 110% of the minimum intensity.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for controlling dispersion in a transmission line, comprising the steps of:

detecting the intensity of a specific frequency component of an optical signal transmitted through the transmission line, the optical signal having an intensity v. total dispersion characteristic curve with at least two peaks; and controlling the amount of total dispersion of the transmission line to substantially minimize the intensity of the specific frequency component between the two highest peaks of the intensity v. total dispersion characteristic curve of the optical signal.

2. A method as in claim 1, wherein the optical signal is modulated by a data signal having a bit rate of B bits/second, and the specific frequency component is a B hertz component of the optical signal.

3. A method as in claim 2, wherein the step of controlling comprises:

controlling the amount of total dispersion of the transmission line by controlling a dispersion value of a variable dispersion compensator which effects the dispersion of the transmission line.

4. A method as in claim 2, wherein the transmission line includes a light source having a variable wavelength for varying the wavelength of the optical signal, and the step of controlling comprises:

controlling the amount of total dispersion of the transmission line by controlling the variable wavelength of the light source.

5. A method as in claim 2, wherein the optical signal is a non-return-to-zero signal.

6. A method as in claim 2, wherein the optical signal is an optical time-division multiplexed signal in which a plurality of return-to-zero signals are multiplexed, the plurality of return-to-zero signals having lightwave phases and data signal phases different from each other and having tails overlap with each other.

7. A method as in claim 2, wherein the step of controlling comprises:

continuously controlling the amount of total dispersion on the basis of the intensity of the detected specific frequency component.

8. A method as in claim 1, wherein the step of controlling comprises:

controlling the amount of total dispersion of the transmission line by controlling a dispersion value of a variable dispersion compensator which effects the dispersion of the transmission line.

9. A method as in claim 1, wherein the transmission line includes a light source having a variable wavelength for varying the wavelength of the optical signal, and the step of controlling comprises:

controlling the amount of total dispersion of the transmission line by controlling the variable wavelength of the light source.

10. A method as in claim 1, wherein the optical signal is a non-return-to-zero signal.

11. A method as in claim 1, wherein the optical signal is an optical time-division multiplexed signal in which a plurality of return-to-zero signals are multiplexed, the plurality of return-to-zero signals having lightwave phases and data signal phases different from each other and having tails overlap with each other.

12. A method as in claim 1, wherein the step of controlling comprises:

continuously controlling the amount of total dispersion on the basis of the intensity of the detected specific frequency component.

13. A method as in claim 1, wherein the step of controlling further comprises:

controlling the total amount of dispersion with a variable dispersion compensator having a dispersion which is varied in accordance with a control signal provided to the variable dispersion compensator;

superimposing a low frequency signal on the control signal;

extracting a frequency component at the same frequency as the low frequency signal from the detected specific frequency component;

comparing the phase of the extracted frequency component with the phase of the low frequency signal; and generating, based on the result of the phase comparison, the control signal for controlling the amount of total dispersion.

14. A method as in claim 12, wherein the step of controlling further comprises:

controlling the total amount of dispersion with a variable dispersion compensator having a dispersion which is varied in accordance with a control signal provided to the variable dispersion compensator;

superimposing a low frequency signal on the control signal;

extracting a frequency component at the same frequency as the low frequency signal from the detected specific frequency component;

comparing the phase of the extracted frequency component with the phase of the low frequency signal; and generating, based on the result of the phase comparison, the control signal for controlling the amount of total dispersion.

15. A method as in claim 1, wherein the intensity of the specific frequency component is minimized at a midpoint between the two highest peaks of the intensity v. total dispersion characteristic curve of the optical signal.

16. A method as in claim 15, wherein the step of controlling comprises:

sweeping the amount of total dispersion; and finding a control point for the amount of total dispersion from the intensity of the specific frequency component being detected during the sweeping.

17. A method as in claim 1, wherein the intensity of the specific frequency component is substantially minimized by being greater than or equal to the minimum intensity and less than or equal to 110% of the minimum intensity.

18. A method for controlling dispersion in a transmission line, comprising the steps of:
controlling the amount of total dispersion of the transmission line in accordance with a control signal;
superimposing a low frequency signal on the control signal;
detecting the intensity of a specific frequency component of an optical signal transmitted through the transmission line;
extracting a frequency component at the same frequency as the low frequency signal from the detected specific frequency component;
comparing the phase of the extracted frequency component with the phase of the low frequency signal; and
generating, based on the result of the phase comparison, the control signal for controlling the amount of total dispersion.

19. A method comprising:
detecting the intensity of a specific frequency component of an optical signal transmitted through a transmission line; and
controlling the amount of total chromatic dispersion of the transmission line so as to substantially minimize the intensity of the detected specific frequency component.

20. A method as in claim 19, wherein the optical signal is modulated by a data signal having a bit rate of B bits/second, and the specific frequency component is a B hertz component of the optical signal.

21. An apparatus for controlling dispersion in a transmission line, comprising the steps of:
an optical detector detecting the intensity of a specific frequency component of an optical signal transmitted through the transmission line, the optical signal having an intensity v. total dispersion characteristic curve with at least two peaks; and
a controller controlling the amount of total dispersion of the transmission line to substantially minimize the intensity of the specific frequency component between the two highest peaks of the intensity v. total dispersion characteristic curve of the optical signal.

22. An apparatus as in claim 21, wherein the optical signal is modulated by a data signal having a bit rate of B bits/second, and the specific frequency component is a B hertz component of the optical signal.

23. An apparatus as in claim 22, wherein the transmission line includes a variable dispersion compensator having a controllable dispersion value, and the controller controls the amount of total dispersion of the transmission line by controlling the dispersion value of the variable dispersion compensator.

24. An apparatus as in claim 22, wherein the transmission line includes a light source having a variable wavelength for varying the wavelength of the optical signal, and the controller controls the amount of total dispersion of the transmission line by controlling the variable wavelength of the light source.

25. An apparatus as in claim 22, wherein the optical signal is a non-return-to-zero signal.

26. An apparatus as in claim 22, wherein the optical signal is an optical time-division multiplexed signal in which a plurality of return-to-zero signals are multiplexed, the plurality of return-to-zero signals having lightwave phases and data signal phases different from each other and having tails overlap with each other.

27. An apparatus as in claim 22, wherein the controller continuously controls the amount of total dispersion on the basis of the intensity of the detected specific frequency component.

28. An apparatus as in claim 22, wherein the controller comprises:
a low-frequency superimposing circuit superimposing a low frequency signal on a control signal;
a variable dispersion compensator having a dispersion which is varied in accordance with the control signal, to control the total amount of dispersion;
an extraction circuit extracting a frequency component at the same frequency as the low frequency signal from the detected specific frequency component;
a phase comparator comparing the phase of the extracted frequency component with the phase of the low frequency signal; and
a control signal generator generating, based on the result of the phase comparison, the control signal for controlling the amount of total dispersion.

29. An apparatus as in claim 21, wherein the transmission line includes a variable dispersion compensator having a controllable dispersion value, and the controller controls the amount of total dispersion of the transmission line by controlling the dispersion value of the variable dispersion compensator.

30. An apparatus as in claim 21, wherein the transmission line includes a light source having a variable wavelength for varying the wavelength of the optical signal, and the controller controls the amount of total dispersion of the transmission line by controlling the variable wavelength of the light source.

31. An apparatus as in claim 21, wherein the optical signal is a non-return-to-zero signal.

32. An apparatus as in claim 21, wherein the optical signal is an optical time-division multiplexed signal in which a plurality of return-to-zero signals are multiplexed, the plurality of return-to-zero signals having lightwave phases and data signal phases different from each other and having tails overlap with each other.

33. An apparatus as in claim 21, wherein the controller continuously controls the amount of total dispersion on the basis of the intensity of the detected specific frequency component.

34. An apparatus as in claim 21, wherein the controller comprises:
a variable dispersion compensator having a dispersion which is varied in accordance with a control signal provided to the variable dispersion compensator, to control the total amount of dispersion;
a low-frequency superimposing circuit superimposing a low frequency signal on the control signal;
an extraction circuit extracting a frequency component at the same frequency as the low frequency signal from the detected specific frequency component;
a phase comparator comparing the phase of the extracted frequency component with the phase of the low frequency signal; and
a control signal generator generating, based on the result of the phase comparison, the control signal for controlling the amount of total dispersion.

35. An apparatus as in claim 21, wherein the intensity of the specific frequency component is minimized at a midpoint between the two highest peaks of the intensity v. total dispersion characteristic curve of the optical signal.

36. An apparatus as in claim 21, wherein the intensity of the specific frequency component is substantially minimized by being greater than or equal to the minimum intensity and less than or equal to 110% of the minimum intensity.

37. An apparatus for controlling dispersion in a transmission line, comprising:
   a low-frequency superimposing circuit superimposing a low frequency signal on a control signal;
   a dispersion compensator controlling the amount of total dispersion of the transmission line in accordance with the control signal;
   a detector detecting the intensity of a specific frequency component of an optical signal transmitted through the transmission line;
   an extraction circuit extracting a frequency component at the same frequency as the low frequency signal from the detected specific frequency component;
   a phase comparator comparing the phase of the extracted frequency component with the phase of the low frequency signal; and
   a control signal generator generating, based on the result of the phase comparison, the control signal for controlling the amount of total dispersion.

38. An apparatus comprising:
   a detector detecting the intensity of a specific frequency component of an optical signal transmitted through a transmission line; and
   a dispersion controlling device controlling the amount of total chromatic dispersion of the transmission line so as to substantially minimize the intensity of the detected specific frequency component.

39. An apparatus as in claim 38, wherein the optical signal is modulated by a data signal having a bit rate of B bits/second, and the specific frequency component is a B hertz component of the optical signal.

40. A method comprising the steps of:
   transmitting a time-division multiplexed optical signal, modulated by an n·m-bit/second data signal obtained by time-division multiplexing n optical signals each amplitude-modulated by an m-bit/second data signal, through an optical fiber transmission line, the time-division multiplexed optical signal having an intensity v. total dispersion characteristic curve with at least two peaks; and
   performing one of the group consisting of
      (a) detecting an n·m-hertz frequency component from the time-division multiplexed optical signal after being transmitted through the optical fiber transmission line, and controlling the amount of total dispersion of the optical fiber transmission line to substantially minimize the intensity of the detected n·m-hertz frequency component between the two highest peaks of the intensity v. total dispersion characteristic curve of the time-division multiplexed optical signal, and
      (b) detecting an m-hertz frequency component from the time-division multiplexed optical signal after being transmitted through the optical fiber transmission line, and then controlling the amount of total dispersion of the optical fiber transmission line to maximize the intensity of the detected m-hertz frequency component.

41. An apparatus comprising:
   a transmitter transmitting a time-division multiplexed optical signal, modulated by an n·m-bit/second data signal obtained by time-division multiplexing n optical signals each amplitude-modulated by an m-bit/second data signal, through an optical fiber transmission line, the time-division multiplexed optical signal having an intensity v. total dispersion characteristic curve with at least two peaks; and
   a controller performing one of the group consisting of
      (a) detecting an n·m-hertz frequency component from the time-division multiplexed optical signal after being transmitted through the optical fiber transmission line, and controlling the amount of total dispersion of the optical fiber transmission line to substantially minimize the intensity of the detected n·m-hertz frequency component between the two highest peaks of the intensity V. total dispersion characteristic curve of the time-division multiplexed optical signal, and
      (b) detecting an m-hertz frequency component from the time-division multiplexed optical signal after being transmitted through the optical fiber transmission line, and then controlling the amount of total dispersion of the optical fiber transmission line to maximize the intensity of the detected m-hertz frequency component.

42. A method for controlling dispersion in a transmission line, comprising the steps of:
   detecting the intensity of a specific frequency component of an optical signal transmitted through the transmission line, the optical signal having an intensity v. total dispersion characteristic curve with a corresponding eye opening; and
   controlling the amount of total dispersion of the transmission line to substantially minimize the intensity of the specific frequency component in the eye opening.

43. A method as in claim 42, wherein the optical signal is modulated by a data signal having a bit rate of B bits/second, and the specific frequency component is a B hertz component of the optical signal.

44. A method as in claim 43, wherein the step of controlling comprises:
   controlling the amount of total dispersion of the transmission line by controlling a dispersion value of a variable dispersion compensator which effects the dispersion of the transmission line.

45. A method as in claim 43, wherein the optical signal is a non-return-to-zero signal.

46. A method as in claim 43, wherein the optical signal is an optical time-division multiplexed signal in which a plurality of return-to-zero signals are multiplexed, the plurality of return-to-zero signals having lightwave phases and data signal phases different from each other and having tails overlap with each other.

47. A method as in claim 42, wherein the step of controlling comprises:
   controlling the amount of total dispersion of the transmission line by controlling a dispersion value of a variable dispersion compensator which effects the dispersion of the transmission line.

48. A method as in claim 42, wherein the optical signal is a non-return-to-zero signal.

49. A method as in claim 42, wherein the optical signal is an optical time-division multiplexed signal in which a plurality of return-to-zero signals are multiplexed, the plurality of return-to-zero signals having lightwave phases and data signal phases different from each other and having tails overlap with each other.

50. A method as in claim 42, wherein the intensity of the specific frequency component is substantially minimized by being greater than or equal to the minimum intensity and less than or equal to 110% of the minimum intensity.

51. An apparatus for controlling dispersion in a transmission line, comprising:
    a detector detecting the intensity of a specific frequency component of an optical signal transmitted through the transmission line, the optical signal having an intensity v. total dispersion characteristic curve with a corresponding eye opening; and
    a controller controlling the amount of total dispersion of the transmission line to substantially minimize the intensity of the specific frequency component in the eye opening.

52. An apparatus as in claim 51, wherein the optical signal is modulated by a data signal having a bit rate of B bits/second, and the specific frequency component is a B hertz component of the optical signal.

53. An apparatus as in claim 52, wherein the optical signal is a non-return-to-zero signal.

54. An apparatus as in claim 52, wherein the optical signal is an optical time-division multiplexed signal in which a plurality of return-to-zero signals are multiplexed, the plurality of return-to-zero signals having lightwave phases and data signal phases different from each other and having tails overlap with each other.

55. An apparatus as in claim 51, wherein the controller controls the amount of total dispersion of the transmission line by controlling a dispersion value of a variable dispersion compensator which effects the dispersion of the transmission line.

56. An apparatus as in claim 51, wherein the optical signal is a non-return-to-zero signal.

57. An apparatus as in claim 51, wherein the optical signal is an optical time-division multiplexed signal in which a plurality of return-to-zero signals are multiplexed, the plurality of return-to-zero signals having lightwave phases and data signal phases different from each other and having tails overlap with each other.

58. An apparatus as in claim 51, wherein the intensity of the specific frequency component is substantially minimized by being greater than or equal to the minimum intensity and less than or equal to 110% of the minimum intensity.

59. A method for controlling dispersion in a transmission line, comprising the steps of:
    detecting the intensity of a specific frequency component of an optical signal transmitted through the transmission line, the optical signal having an intensity v. total dispersion characteristic curve with a corresponding eye opening; and
    controlling the intensity of the specific frequency component to substantially minimize the detected intensity of the specific frequency component in the eye opening.

60. A method as in claim 59, wherein the optical signal is modulated by a data signal having a bit rate of B bits/second, and the specific frequency component is a B hertz component of the optical signal.

61. A method as in claim 60, wherein the optical signal is a non-return-to-zero signal.

62. A method as in claim 60, wherein the optical signal is an optical time-division multiplexed signal in which a plurality of return-to-zero signals are multiplexed, the plurality of return-to-zero signals having lightwave phases and data signal phases different from each other and having tails overlap with each other.

63. A method as in claim 59, wherein the optical signal is a non-return-to-zero signal.

64. A method as in claim 63 wherein the optical signal is an optical time-division multiplexed signal in which a plurality of return-to-zero signals are multiplexed, the plurality of return-to-zero signals having lightwave phases and data signal phases different from each other and having tails overlap with each other.

65. A method as in claim 59, wherein the intensity of the specific frequency component is substantially minimized by being greater than or equal to the minimum intensity and less than or equal to 110% of the minimum intensity.

66. An apparatus for controlling dispersion in a transmission line, comprising the steps of:
    a detector detecting the intensity of a specific frequency component of an optical signal transmitted through the transmission line, the optical signal having an intensity v. total dispersion characteristic curve with a corresponding eye opening; and
    a controller controlling the intensity of the specific frequency component to substantially minimize the detected intensity of the specific frequency component in the eye opening.

67. An apparatus as in claim 66, wherein the optical signal is modulated by a data signal having a bit rate of B bits/second, and the specific frequency component is a B hertz component of the optical signal.

68. An apparatus as in claim 67, wherein the optical signal is a non-return-to-zero signal.

69. An apparatus as in claim 67, wherein the optical signal is an optical time-division multiplexed signal in which a plurality of return-to-zero signals are multiplexed, the plurality of return-to-zero signals having lightwave phases and data signal phases different from each other and having tails overlap with each other.

70. An apparatus as in claim 66, wherein the optical signal is a non-return-to-zero signal.

71. An apparatus as in claim 66, wherein the optical signal is an optical time-division multiplexed signal in which a plurality of return-to-zero signals are multiplexed, the plurality of return-to-zero signals having lightwave phases and data signal phases different from each other and having tails overlap with each other.

72. An apparatus as in claim 66, wherein the intensity of the specific frequency component is substantially minimized by being greater than or equal to the minimum intensity and less than or equal to 110% of the minimum intensity.

73. A method for controlling dispersion in a transmission line, comprising the steps of:
    detecting the intensity of a specific frequency component of an optical signal transmitted through the transmission line, the optical signal having an intensity v. total dispersion characteristic curve with a corresponding, overlapping eye opening; and
    controlling the amount of total dispersion of the transmission line to maintain the intensity of the specific frequency component along a point on the intensity v. total dispersion characteristic curve which is within the eye opening.

74. An apparatus for controlling dispersion in a transmission line, comprising:
    a detector detecting the intensity of a specific frequency component of an optical signal transmitted through the transmission line, the optical signal having an intensity v. total dispersion characteristic curve with a corresponding, overlapping eye opening; and
    a controller controlling the amount of total dispersion of the transmission line to maintain the intensity of the specific frequency component along a point on the intensity v. total dispersion characteristic curve which is within the eye opening.

* * * * *